US009378127B2

(12) United States Patent
Aggarwal et al.

(10) Patent No.: US 9,378,127 B2
(45) Date of Patent: Jun. 28, 2016

(54) DYNAMIC MEMORY PAGE POLICY

(71) Applicants: Aneesh Aggarwal, Portland, OR (US); Tameesh Suri, San Jose, CA (US)

(72) Inventors: Aneesh Aggarwal, Portland, OR (US); Tameesh Suri, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 13/924,273

(22) Filed: Jun. 21, 2013

(65) Prior Publication Data

US 2014/0379987 A1 Dec. 25, 2014

(51) Int. Cl.
*G06F 12/02* (2006.01)

(52) U.S. Cl.
CPC .................................. *G06F 12/0215* (2013.01)

(58) Field of Classification Search
None
See application file for complete search history.

(56) References Cited

U.S. PATENT DOCUMENTS

| | | | | |
|---|---|---|---|---|
| 6,799,241 | B2 * | 9/2004 | Kahn et al. | 711/105 |
| 6,976,122 | B1 * | 12/2005 | Sander et al. | 711/105 |
| 8,861,011 | B2 * | 10/2014 | Hayakawa | 358/1.15 |
| 2005/0060533 | A1 * | 3/2005 | Woo et al. | 713/100 |
| 2008/0052466 | A1 * | 2/2008 | Zulauf | G06F 12/0862 711/125 |
| 2008/0183977 | A1 * | 7/2008 | Gower et al. | 711/154 |
| 2009/0094435 | A1 * | 4/2009 | Lu | 711/216 |

* cited by examiner

*Primary Examiner* — Sean D Rossiter
*Assistant Examiner* — Charles Choi
(74) *Attorney, Agent, or Firm* — Lowenstein Sandler LLP

(57) ABSTRACT

Mechanisms for predicting whether a memory access may be a page hit or a page miss and applying different page policies (e.g., an open page policy or a close page policy) based on the prediction are disclosed. A counter may be used to determine a hit rate (e.g., a percentage or a ratio of the number of memory accesses that are page hits). The processing device may apply different page policies based on the hit rate. A memory access history (that includes data indicating a sequence or list of memory accesses) may be used to identify a counter from a plurality of counters. The processing device may apply different page policies based on the value of the counter (e.g., based on whether the counter is greater than a threshold).

25 Claims, 14 Drawing Sheets

DYNAMIC MEMORY PAGE POLICY

TECHNICAL FIELD

Embodiments described herein generally relate to processing devices and, more specifically, relate to accessing memory.

BACKGROUND

Processing devices access memory when performing operations and/or when executing instructions of an application. For example, a processing device may read data from a memory and/or may write data to a memory when adding two numbers (e.g., may read the two numbers from the memory and may write the result to the memory). A memory may be divided into multiple banks and each bank may include multiple pages. When accessing the memory (e.g., when accessing a page in the memory), the processing device may open the page in order to read data and/or write data to a page. A processing device may use an open page policy or a close page policy when accessing the memory. When using an open page policy, the processing device may keep pages open after accessing (e.g., reading and/or writing data to) the pages. When using a close page policy, the processing device may close a page after it has been accessed.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

Figure 1A:
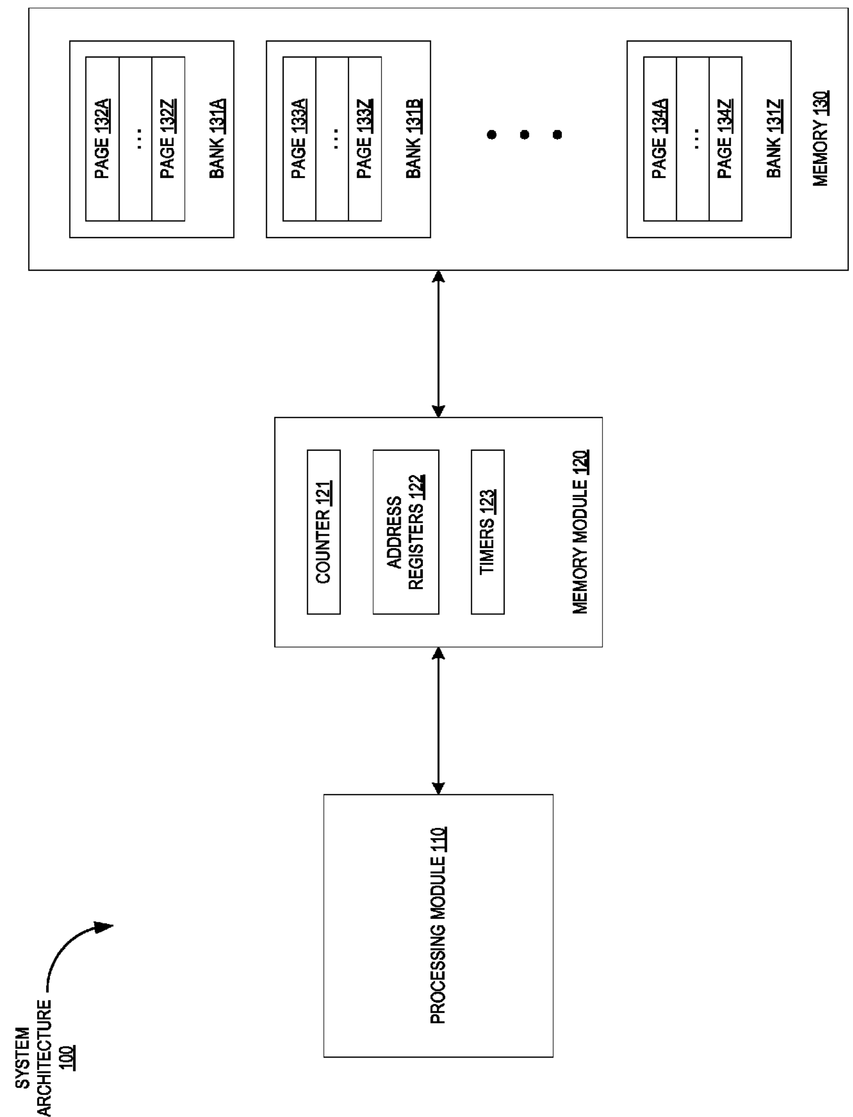
FIG. 1A is a block diagram of a system architecture, according to one embodiment of the disclosure.

As discussed above, a processing device may use an open page policy or a close page policy when accessing the memory. When the processing device uses an open page policy, a page is kept open until a page miss occurs. The open page policy may allow the processing device to save time when a page hit occurs because the processing device may not activate the open page when the page is already open. However, the open page policy may cause a delay when a page miss occurs because the processing device may perform a pre-charge operation that closes the current open page and applies an electrical current or charge to another page. When the processing device uses a close page policy, a page is closed after it has been accessed. A close page policy may allow the processing device to save time when a page miss occurs because the page is already closed and the processing device may skip the pre-charge operation. However, the close page policy may cause a delay when a page hit occurs because the processing device may activate the requested page before the processing device can access the requested page.

Different applications and even different blocks of instructions in an application may access memory differently. For example, the instructions of an application may access open pages more frequently (e.g., access the same page that is already open) or may access closed pages more frequently (e.g., may randomly access different pages in a bank). The processing device may be able to execute instructions of the application more efficiently or more quickly if an open page policy is used when accessing the memory and may be able to execute the instructions more efficiently or more quickly than if a close page policy is used when accessing the memory. However, processing devices may generally use a static page policy (e.g., either the open page policy or the close page policy) even though different applications and/or different blocks of instructions may benefit from using different page policies.

Embodiments of the disclosure provide for predicting whether a memory access may be a page hit or a page miss and applying different page policies (e.g., an open page policy or a close page policy) based on the prediction. In one embodiment, a counter may be used to determine a hit rate (e.g., a percentage or a ratio of the number of memory accesses that are page hits). When the hit rate is above a threshold, a processing device may predict that the next memory access will be a page hit and may apply an open page policy. When the hit rate is less than or equal to the threshold, the processing device may predict that the next memory access will be a page miss and may apply a close page policy. The counter may be updated as subsequent memory accesses occur. In another embodiment, a memory access history (that includes data indicating a sequence or list of memory accesses) may be used to identify a counter from a plurality of counters. The counter may be used to predict whether the next memory access will be a page hit or page miss. When the counter is above a threshold, a processing device may predict that the next memory access will be a page hit and may apply an open page policy. When the counter is less than or equal to the threshold, the processing device may predict that the next memory access will be a page miss and may apply a close page policy. The counter and the memory access history may be updated as subsequent memory accesses occur.

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

FIG. 1A is a block diagram of a system architecture, according to one embodiment of the disclosure. The system architecture 100 includes a processing module 110, a memory module 120, and a memory 130. In one embodiment, the memory module 120 may be included as a component in the processing module 110 (e.g., may be part of the processing module 110). For example, the memory module 120 may be a processing logic that may comprise hardware (e.g., circuitry, dedicated logic, programmable logic, microcode, etc.), software (such as instructions run on a processing device), firmware, or a combination thereof, within the processing module 110. In another embodiment, the memory module 120 may be may comprise hardware (e.g., circuitry, dedicated logic, programmable logic, microcode, etc.), software (such as instructions run on a processing device), firmware, or a combination thereof, that is separate from the processing module 110 (e.g., may be a separate circuit).

Processing module 110 may execute instructions of one or more applications. The application may be a program, a software module, a software component, and/or other software element that may be executing by the processing module 110. The application may include a plurality of instructions. The instructions may include program code to cause processing module 110 to perform activities such as, but not limited to, reading data, writing data, processing data, formulating data, converting data, transforming data, etc. For example, the application may be a binary file and/or an executable file that includes instructions to cause the processing module to execute a media player to play media items (such as digital videos, digital music) or to cause the processing module to execute a web browser. The instructions in the application may be divided into blocks of instructions (e.g., a series or group of instructions), such as instruction blocks. The instructions and/or instruction blocks of the application may include a variety of different instructions (e.g., program instructions). For example, the instructions and/or instruction blocks may include an ADD instruction (to add two or more values), a MULT instruction (to multiple two or more values), an exclusive-OR (XOR) instruction (to exclusive- or two or more values), an AND instruction (to perform a bit-wise and on two or more values), a store instruction (to store a value in a memory location, such as a register), a JUMP instruction (to direct the flow of execution of the instructions to a particular instruction), a BRANCH instruction (to direct the flow of execution of the instructions to a particular instruction based on one or more conditions, etc.).

The processing module 110, as one illustrative example, may include a complex instruction set computer (CISC) microprocessor, a reduced instruction set computing (RISC) microprocessor, a very long instruction word (VLIW) microprocessor, a multi-core processor, a multithreaded processor, an ultra-low voltage processor, an embedded processor, a processor implementing a combination of instruction sets, and/or any other processor device, such as a digital signal processor, for example. The processing module 110 may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processing module 110 may be from another company, such as ARM Holdings, Ltd, MIPS, etc. The processing module 110 may be a special-purpose processor, such as, for example, a network or communication processor, compression engine, graphics processor, co-processor, embedded processor, an application specific integrated circuit (ASIC), a field programmable gate array (FPGA), a digital signal processor (DSP), or the like. The processing module 110 may be implemented on one or more chips. The processing module 110 may be a part of and/or may be implemented on one or more substrates using any of a number of process technologies, such as, for example, BiCMOS, CMOS, or NMOS.

The memory 130 may one or more components, gates, processing logic, circuits, and/or other hardware that may store data. In one embodiment, the memory 130 may be a random-access device that (such as a random-access memory (RAM)) that allows stored data to be accessed directly in any random order. Examples of random access devices (or memories) may include, but are not limited to dynamic RAM (DRAM) and static RAM (SRAM). In one embodiment, DRAM may be a type of random-access memory that stores each bit of data in a separate capacitor within an integrated circuit. Examples of DRAM include, but are not limited to, double data rate synchronous RAM (DDR SDRAM), double data rate type 2 synchronous RAM (DDR2 SDRAM), and double data rate type 3 synchronous RAM (DDR3 SDRAM), etc. In another embodiment, SRAM may be a type of memory that uses latching circuitry to store each bit of data. In one embodiment, the memory 130 may be a volatile memory. A volatile memory may be a memory that requires power to maintain the stored data or information. The memory 130 may also be referred to as main memory.

The memory 130 may include multiple banks 131A through 131Z. Each of the banks 131A through 131Z includes multiple pages. For example, bank 131A includes pages 132A through 132Z, bank 131B includes pages 133A through 133Z, and bank 131Z includes pages 134A through 134Z. It should be understood that the memory 130 may include any number of banks (e.g., may include 16 banks, 32 banks, 64 banks, etc.). It should also be understood that each bank may include any number of pages (e.g., may include 1024 pages, 2048 pages, etc.). In one embodiment, the pages of the memory 130 (e.g., pages 132A through 132Z) may include instructions of an application that are executed by the processing module 110. For example, the page 132A may store an ADD instruction from the application. In another embodiment, the pages of the memory 130 (e.g., pages 134A through 134Z) may include data that is used by the instructions of the application. For example, an ADD instruction may add a first number with a second number to generate a third number. One or more of the first number, the second number, and the third number may be stored in the page 134Z.

In one embodiment, the memory module 120 may be processing logic that may comprise hardware (e.g., circuitry, dedicated logic, programmable logic, microcode, etc.), software (such as instructions run on a processing device), firmware, or a combination thereof, that may allow the processing module 110 to access and/or use the memory 130. For example, the memory module 120 may be a circuit that allows a processing device (e.g., processing module 110) to access DRAM (e.g., memory 130). The memory module 120 allows the processing module 110 to read and/or write data to the pages (e.g., page 133A) in the banks (e.g., bank 131B) of the memory 130. The memory module 120 includes a counter 121, a plurality of address registers 122, and a plurality of timers 123. The memory module 120 may also be referred to as a memory controller.

In one embodiment, the memory module 120 may open a page within one of the banks 131A through 131X to read data from and/or write data to the page. For example, when the processing module 110 requests data from the memory 130, the memory module 120 may determine whether the data is stored in any of the pages in the memory. If the data is stored in one of the pages of the memory, the memory module 120 may open the page and provide the data to the processing module 110. If a page is already open, the bank may read the data from the open page and may provide the data to the processing module 110. In one embodiment, each bank may have one page open at a time. For example, bank 131A may have one of pages 132A through 132Z open at one time. If page 132A is open and the processing module 110 requests data stored in page 132Z, the memory module 120 may close page 132A and open page 132Z to access the data in page 132Z. In another embodiment, each bank may have multiple pages open at the same time. For example, the memory module 120 may have pages 133A and 133Z open at the same time. In one embodiment, when the processing module 110 requests to read and/or write to a page that is already open (e.g., an open page), memory module 120 may classify the request as a hit or a page hit because the requested page was already open in the memory 130. In another embodiment, when the processing module 110 requests to read and/or write to a page that is closed (e.g., a closed page), the memory module 120 may classify the request as a miss or a page miss, because the requested page was not open in the memory 130. In another embodiment, when the processing module 110 requests to read and/or write data that is not in the memory 130, the memory module 120 may classify the request as a miss or a page miss, because the data is not in the memory 130.

As discussed above, an open page policy or a close page policy may be applied to the pages and/or banks in the memory 130. When the memory module 120 uses an open page policy, a page is kept open until a page miss occur. For example, if page 132A is open in bank 131A, page 132A will be kept open (e.g., will remain an open page) until a request to access another page in the bank 131A (e.g., page 132Z) is received. When the request to access page 132Z in the bank 131A is received, the memory module 120 may close page 132A and open page 132Z. In one embodiment, an open page policy may allow the memory module 120 to save time when a page hit occurs because the memory module 120 may not activate the open page when the page is already open. However, the open page policy may cause a delay when a page miss occurs because the memory module 120 may perform a pre-charge operation that closes the current open page and applies an electrical current or change to another page. When the memory module 120 uses a close page policy, a page is closed after it has been accessed. For example, if the processing module 110 requests access to page 133A, the memory module 120 may open page 133A, read and/or write data to page 133A, and close page 133A. In one embodiment, a close page policy may allow the memory module 120 to save time when a page miss occurs because the page is already closed and the memory module 120 may skip the pre-charge operation. However, the close page policy may cause a delay when a page hit occurs because the memory module 120 may activate the requested page before the memory module 120 can access the requested page.

In one embodiment, the memory module 120 may track the memory accesses (e.g., pages read and/or written) from the processing device using the counter 121. The counter 121 may allow the memory module 120 to track the number of page hits and/or page misses when the processing module 110 accesses pages in the memory 130. The memory module 120 may also track the total number of memory access (e.g., requests to access pages) using an additional counter (not shown in the figure) and/or the same counter 121. The memory module 120 may determine a hit rate (e.g., a percentage of the total memory access that were page hits) based on the counter 121. For example, if the memory module 120 tracks memory accesses and determines that there were one-hundred memory accesses total and that fifty-five of the memory accesses were page hits, the memory module 120 may determine that the hit rate is 55% (e.g., 0.55). In another example, the memory module 120 may determine a miss rate (e.g., a percentage of the total memory accesses that were page misses). In one embodiment, the counter 121 may be updated as page hits and/or pages misses occur. For example, if the counter 121 tracks page hits, then the counter 121 may be incremented each time a page hit occurs. The additional counter (not show in the figure) that tracks the total number of memory access may also be incremented each time a memory access occurs. For example, each time the memory 130 is accessed, the additional counter may be incremented.

In one embodiment, the memory module 120 may also use the address registers 122 to determine whether a memory access (e.g., requests to access a page) is a page hit or a page miss. The address registers 122 may store an identifier for the last accessed page for each bank. For example, the address registers 122 may store an address for the last accessed page in a bank. In another example, the address registers 122 may store an identifier (e.g., "Page 3-Bank 2") that may be used to identify a particular page in a particular bank in the memory 130. As discussed above, multiple pages per bank may be open in the memory 130. In one embodiment, the address registers may store multiple page identifiers for each bank. For example, if two pages may be open in each bank in the memory 130, the address registers 122 may store identifiers for the last two pages that were accessed for each bank. If a request to access a page in memory is received and the requested page matches a page in the address registers 122, the memory module 120 may determine that the memory access is a page hit. If a request to access a page in memory is received and the requested page does not match a page in the address registers 122, the memory module 120 may determine that the memory access is page miss.

Different applications and even different blocks of instructions in an application may access the memory 130 differently. For example, the instructions of an application may access open pages more frequently (e.g., access the same page that is already open) and processing module 110 may be able to execute the instructions of the first application more efficiently or more quickly if an open page policy is used when accessing the memory 130. In another example, a first block of instructions in an application may access open pages more frequently and a second block of instructions in the application may access closed pages more frequently (e.g., may randomly access different pages in the bank). The processing module 110 may be able to execute the first block of instructions more efficiently or more quickly if an open page policy is used when accessing the memory 130 and may be able to execute the second block of instructions more efficiently or more quickly if a close page policy is used when accessing the memory 130.

In embodiment, the memory module 120 may switch between an open page policy and a close page policy, based on the hit rate (and/or miss rate) of the memory accesses (e.g., page accesses) to the memory 130. The memory module 120 may use a threshold value or a threshold hit rate to determine whether an open policy or a close page policy should be used when accessing memory 130. For example, the memory module 120 may predict that a next memory access will be a page hit use an open page policy if the hit rate is greater than 50%. The memory module 120 may also predict that the next memory access will be a page miss and may use a close page policy if the hit rate is less than or equal to 50%. In another example, the memory module 120 may use an open page policy if the hit rate is greater than 60% and may use a close page policy if the hit rate is less than or equal to 60%. In one embodiment, switching between an open page policy and a close page policy may allow the processing module 110 to executing instructions more quickly or more efficiently for different applications or different blocks of instructions in an application because the memory module 120 may be able to reduce the amount of time taken to access pages in memory 130. For example, if the hit ratio is higher than a threshold, then keeping pages open (e.g., using an open page policy) may allow the processing module 110 to execute instructions faster because most of the instructions are accessing pages that are already open.

In another embodiment, the memory module 120 may override an open page policy or a close page policy based on pending memory accesses. For example, the memory module 120 may use an open page policy because the hit rate for memory access may be above a threshold (e.g., above 50%). The memory module 120 may include a buffer and/or a queue (not shown in the figures) of pending memory access requests received from the processing module 110. If a pending memory access request will cause a page miss for a bank in the memory 130, the memory module 120 may close the current open page for the bank, even though the memory module 120 is applying or using an open page policy for accessing memory 130. In another example, the memory module 120 may use a close page policy because the hit rate for memory access may be below a threshold (e.g., below 50%). If a pending memory access request will access a currently open page in a bank in the memory 130, the memory module 120 may keep the currently open page for the bank open, even though the memory module 120 is applying or using a close page policy for accessing memory 130.

In one embodiment, the memory module 120 may also use timers 123 to determine whether an open page has been accessed during a period of time. For example, the memory module 120 may use a timer from the timers 123 to determine whether page 134A (which may be currently open) has been accessed in the last 10 milliseconds. If page 134A has not been accessed in the last 10 milliseconds, the memory module 120 may close the page even though an open page policy is being used to access the memory 130. In other embodiments, any duration or period of time may be used. For example, a time period or duration of 100 nanoseconds, 1 second, 500 milliseconds, etc., may be used. In one embodiment, the timers 123 may include one timer for each bank in the memory 130 (e.g., each bank may be associated with a timer). For example, the timers 123 may include a timer for bank 131A, a timer for bank 131B, etc. The memory module 120 may also reset the timer associated with a bank if a page in the bank is accessed.

In one embodiment, the memory module 120 may reset the counter 121. Resetting the counter 121 may allow the memory module 120 to more accurately determine the hit rate for different applications and/or different blocks of instructions in an application. As discussed above, a first application may access open pages more often and a second application may access closed pages more often. The counter 121 may have a high hit rate when the processing module 110 is executing the first application and the memory module 120 may use an open page policy for the memory 130. The memory module 120 may reset the counter 121 when the second application is executed by the processing module 110 to allow the memory module 120 to more accurately determine the hit rate when executing instructions for the second application.

Figure 1B:
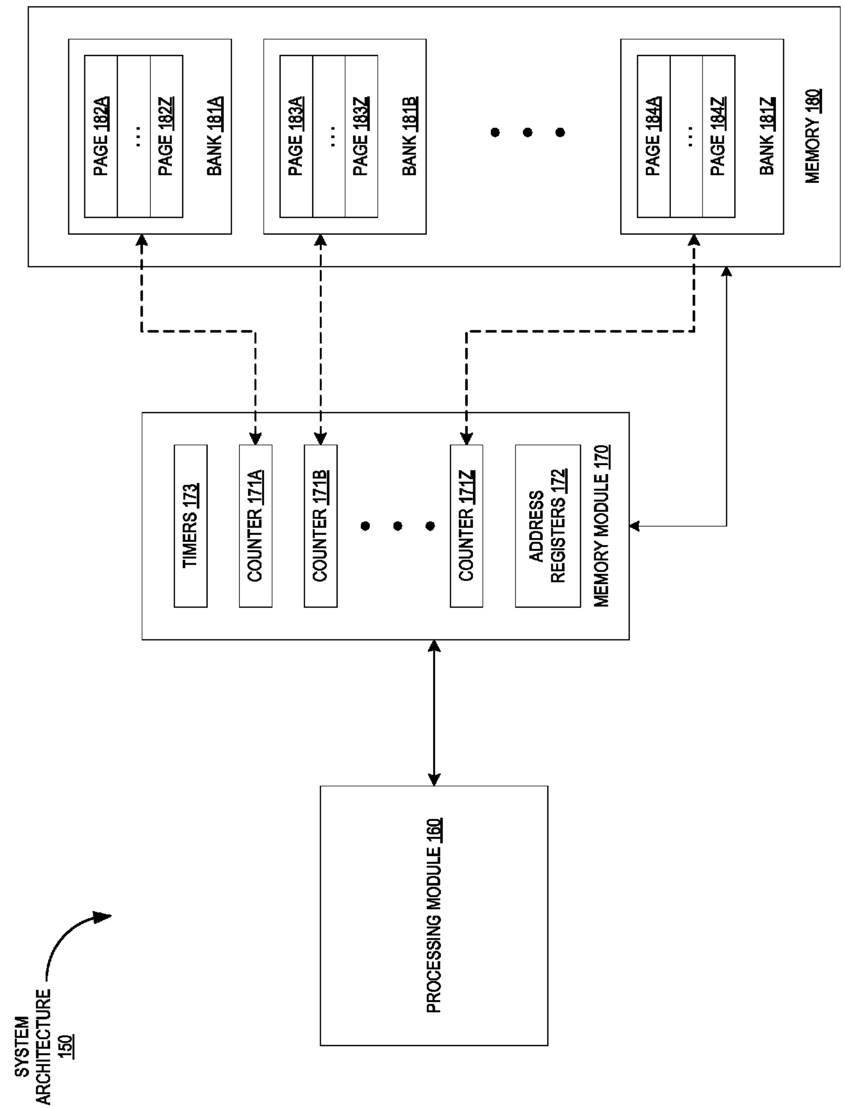
FIG. 1B is a block diagram of a system architecture, according to another embodiment of the disclosure.

FIG. 1B is a block diagram of a system architecture, according to another embodiment of the disclosure. The system architecture 150 includes a processing module 160, a memory module 170, and a memory 180. In one embodiment, the memory module 170 may be included as a component in the processing module 160 (e.g., may be part of the processing module 160). For example, the memory module 170 may be a processing logic that may comprise hardware (e.g., circuitry, dedicated logic, programmable logic, microcode, etc.), software (such as instructions run on a processing device), firmware, or a combination thereof, within the processing module 160. In another embodiment, the memory module 170 may be may comprise hardware (e.g., circuitry, dedicated logic, programmable logic, microcode, etc.), software (such as instructions run on a processing device), firmware, or a combination thereof, that is separate from the processing module 160 (e.g., may be a separate circuit).

Processing module 160 may execute instructions of one or more applications (e.g., a program, a software module, a software component, and/or other software element). The application may include a plurality of instructions. The instructions may include program code to cause processing module 160 to perform activities such as, but not limited to, reading data, writing data, processing data, formulating data, converting data, transforming data, etc. The instructions in the application may be divided into blocks of instructions (e.g., a series or group of instructions), such as instruction blocks. The instructions and/or instruction blocks of the application may include a variety of different instructions (e.g., program instructions). The processing module 160, as one illustrative example, may include a complex instruction set computer (CISC) microprocessor, a reduced instruction set computing (RISC) microprocessor, a very long instruction word (VLIW) microprocessor, a multi-core processor, a multithreaded processor, an ultra-low voltage processor, an embedded processor, a processor implementing a combination of instruction sets, and/or any other processor device, such as a digital signal processor, for example. The processing module 160 may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processing module 160 may be from another company, such as ARM Holdings, Ltd, MIPS, etc. The processing module 160 may be a special-purpose processor, such as, for example, a network or communication processor, compression engine, graphics processor, co-processor, embedded processor, an application specific integrated circuit (ASIC), a field programmable gate array (FPGA), a digital signal processor (DSP), or the like. The processing module 160 may be implemented on one or more chips. The processing module 160 may be a part of and/or may be implemented on one or more substrates using any of a number of process technologies, such as, for example, BiCMOS, CMOS, or NMOS.

The memory 180 may one or more components, gates, processing logic, circuits, and/or other hardware that may store data. In one embodiment, the memory 180 may be a random-access device that (such as a random-access memory (RAM)) that allows stored data to be accessed directly in any random order. In one embodiment, the memory 180 may be a volatile memory. The memory 180 may also be referred to as main memory. The memory 180 may include multiple banks 181A through 181Z. Each of the banks 181A through 181Z includes multiple pages. It should be understood that the memory 180 may include any number of banks (e.g., may include 16 banks, 32 banks, 64 banks, etc.). It should also be understood that each bank may include any number of pages (e.g., may include 1024 pages, 2048 pages, etc.). In one embodiment, the pages of the memory 180 (e.g., pages 182A through 182Z) may include instructions of an application that are executed by the processing module 160. In another embodiment, the pages of the memory 180 (e.g., pages 184A through 184Z) may include data that is used by the instructions of the application.

In one embodiment, the memory module 170 may be processing logic that may comprise hardware (e.g., circuitry, dedicated logic, programmable logic, microcode, etc.), software (such as instructions run on a processing device), firmware, or a combination thereof, that may allow the processing module 160 to access and/or use the memory 180. The memory module 170 allows the processing module 160 to read and/or write data to the pages (e.g., page 183A) in the banks (e.g., bank 181B) of the memory 180. The memory module 170 includes counters 171A through 171Z, a plurality of address registers 172, and a plurality of timers 173. The memory module 170 may also be referred to as a memory controller. In one embodiment, the memory module 170 may open a page within one of the banks 181A through 181Z to read data from and/or write data to the page. In another embodiment, each bank may have multiple pages open at the same time. For example, bank 181B may have pages 183A and 183Z open at the same time. As discussed above, an open page policy or a close page policy may be applied to the pages and/or banks in the memory 180. When the memory module 170 uses an open page policy, a page is kept open until a page miss occur. When the memory module 170 uses a close page policy, a page is closed after it has been accessed.

In one embodiment, the memory module 170 may track the memory accesses (e.g., pages read and/or written) from the processing device using the counters 171A through 171Z. Each counter may be associated with a bank of memory 180. For example, counter 171A is associated with bank 181A, counter 171B is associated with bank 181B, etc. The counters 171A through 171Z may allow the memory module 170 to track the number of page hits and/or page misses on a per bank basis when the processing module 160 accesses pages in the memory 180. The memory module 170 may also track the total number of memory access (e.g., requests to access pages) for each bank using additional counters (not shown in the figure) and/or the counters 171A through 171Z. The memory module 170 may determine a hit rate (e.g., a percentage of the total memory access that were page hits) for each bank based on the counter associated with the bank. The memory module 170 may also determine a miss rate (e.g., a percentage of the total memory accesses that were page misses) for each bank. In one embodiment, the counters 171A through 171Z may be updated as page hits and/or pages misses occur. For example, if the counter 171A tracks page hits for bank 181A, then the counter 171A may be incremented each time a page hit occurs when accessing bank 181. The additional counter (not show in the figure) that tracks the total number of memory access may also be added each time a memory access occurs. For example, each time the bank 181A of the memory 130 is accessed, the additional counter may be incremented. In one embodiment, the memory module 170 may also use the address registers 172 to determine whether a memory access (e.g., a requests to access a page) is a page hit or a page miss. The address registers 172 may store an identifier for the last accessed page for each bank. As discussed above, multiple pages per bank may be open in the memory 180. In one embodiment, the address registers 172 may store multiple pages for each bank.

In one embodiment, the memory module 170 may reset one or more of the counters 171A through 171Z. Resetting the counters 171A through 171Z may allow the memory module 170 to more accurately determine the hit rate for different applications and/or different blocks of instructions in an application.

In embodiment, the memory module 170 may switch between an open page policy and a close page policy, based on the hit rate (and/or miss rate) of the memory accesses (e.g., page accesses) to the memory 180. The memory module 170 may use a threshold value or a threshold hit rate to determine whether an open policy or a close page policy should be used when accessing memory 180. For example, if the hit rate is greater than the threshold hit rate, the memory module 170 may apply an open page-policy. In one embodiment, switching between an open page policy and a close page policy the memory module 170 may allow the processing module 160 to executing instructions more quickly or more efficiently for different applications or different blocks of instructions in an application because the memory module 170 may be able to reduce the amount of time taken to access pages in memory 180. In one embodiment, the memory module 170 may apply a different policy (e.g., an open page policy or close page policy) to each bank in the memory 180. In another embodiment, the memory module 170 may use a different threshold (e.g., a different threshold hit rate) for different banks in the memory 180.

In another embodiment, the memory module 170 may override an open page policy or a close page policy based on pending memory accesses. The memory module 170 may include a buffer and/or a queue (not shown in the figures) of pending memory access requests received from the processing module 160. If a pending memory access request will cause a page miss for a bank in the memory 180, the memory module 170 may close the current open page for the bank, even though the memory module 170 is applying or using an open page policy for accessing memory 180. If a pending memory access request will access a currently open page in a bank in the memory 180, the memory module 170 may keep the currently open page for the bank open, even though the memory module 170 is applying or using a close page policy for accessing memory 180.

In one embodiment, the memory module 170 may also use timers 173 to determine whether an open page has been accessed during a period of time. For example, the memory module 170 may use a timer from the timers 173 to determine whether page 184A (which may be currently open) has been accessed in the last 10 milliseconds and the memory module 170 may close the page. In other embodiments, any duration or period of time may be used. In one embodiment, the timers 173 may include one timer for each bank in the memory 180 (e.g., each bank may be associated with a timer).

Figure 2:
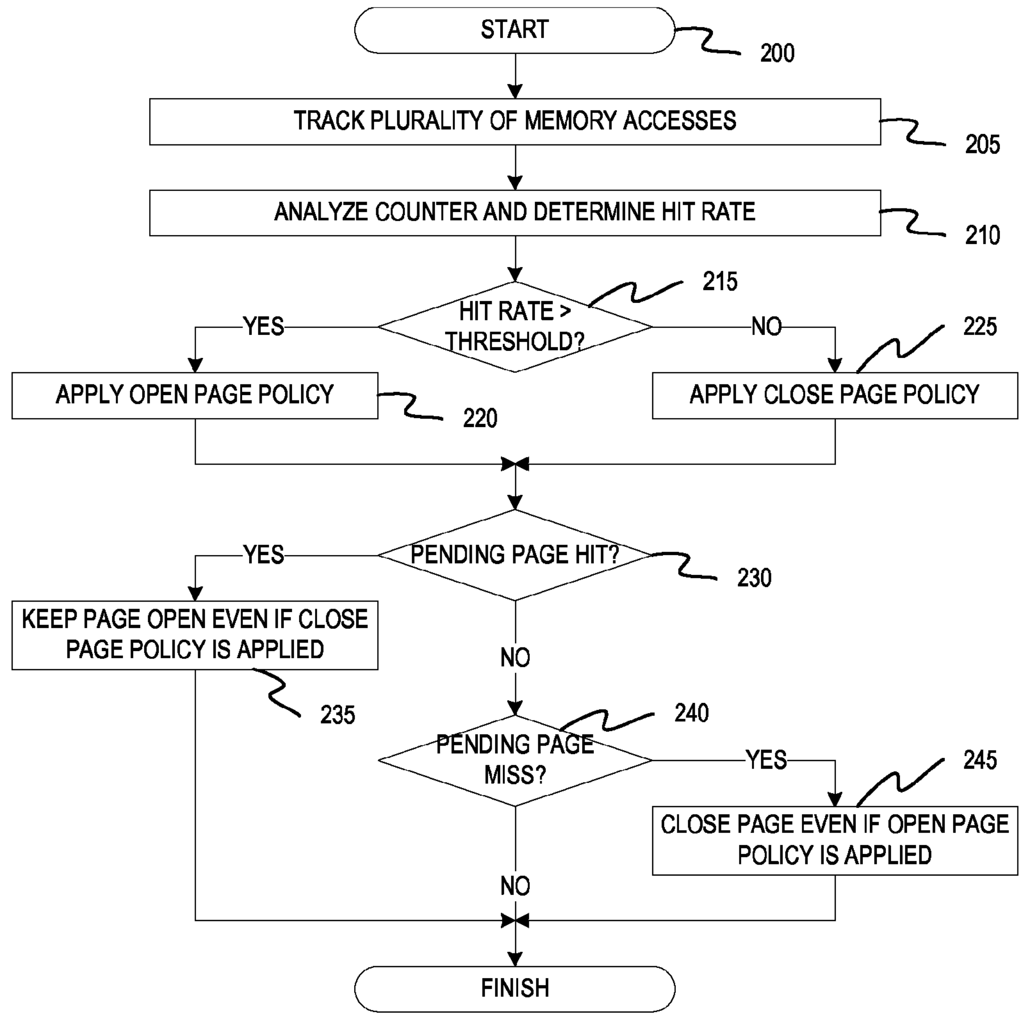
FIG. 2 is a flow diagram illustrating a method of accessing memory, according to one embodiment of the disclosure.

FIG. 2 is a flow diagram illustrating a method of accessing memory, according to one embodiment of the disclosure. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 may be performed by a memory module, as illustrated in FIGS. 1A and 1B. For simplicity of explanation, the method 200 is depicted and described as a series of acts. However, acts in accordance with this disclosure can occur in various orders and/or concurrently and with other acts not presented and described herein. Furthermore, not all illustrated acts may be required to implement the method 200 in accordance with the disclosed subject matter. In addition, those skilled in the art will understand and appreciate that the method 200 could alternatively be represented as a series of interrelated states via a state diagram or events.

Referring to FIG. 2, the method 200 begins at block 205 where the processing logic tracks a plurality of memory accesses. For example, the processing logic may track the total number of memory access to a bank in a memory or to multiple banks in the memory. The processing logic may also increment a counter if a page hit occurs when the counter tracks page hits. In another example, the processing logic may increment a counter if a page miss occurs when the counter tracks page misses. The processing logic analyzes the counter at block 210 to determine the hit rate for the bank in the memory or for multiple banks in the memory (e.g., for the whole memory). The processing logic determines whether the hit rate is over a threshold or a threshold value (block 215). For example, the processing logic may determine a hit rate by dividing the counter by the total number of memory accesses. At block 215, the processing logic determines whether the hit rate is over a certain threshold. For example, the processing logic may determine whether the hit rate is over 50%. If the hit rate is over the threshold, the processing logic may apply an open page policy to one or more of the banks in the memory at block 220. If the hit rate is less than or equal to the threshold, the processing logic may apply a close page policy to one or more of the banks in the memory at block 225.

At block 230, the processing logic determines whether there is a pending memory access that is a page hit. For example, the processing logic may analyze a buffer or queue of pending memory accesses and may determine whether any of the pending memory access will result in a page hit. If there is a pending page hit (e.g., a pending memory access that will be a page hit), the processing logic may keep the page that is requested by the pending memory access open, even though a closed page policy may be applied to one or more banks in the memory (block 235). After block 235, the method 200 ends. If there is no pending page hit (e.g., no pending memory access that will be a page hit), the processing logic may determine whether there is a pending page miss (e.g., a pending memory access that will be a page miss) at block 240. If there is no pending page miss, the method 200 ends. If there is a pending page miss, the processing logic may proceed to block 245 where the processing logic may close the page even if an open policy is applied to one or more banks in the memory. After block 245, the method 200 ends.

Figure 3:
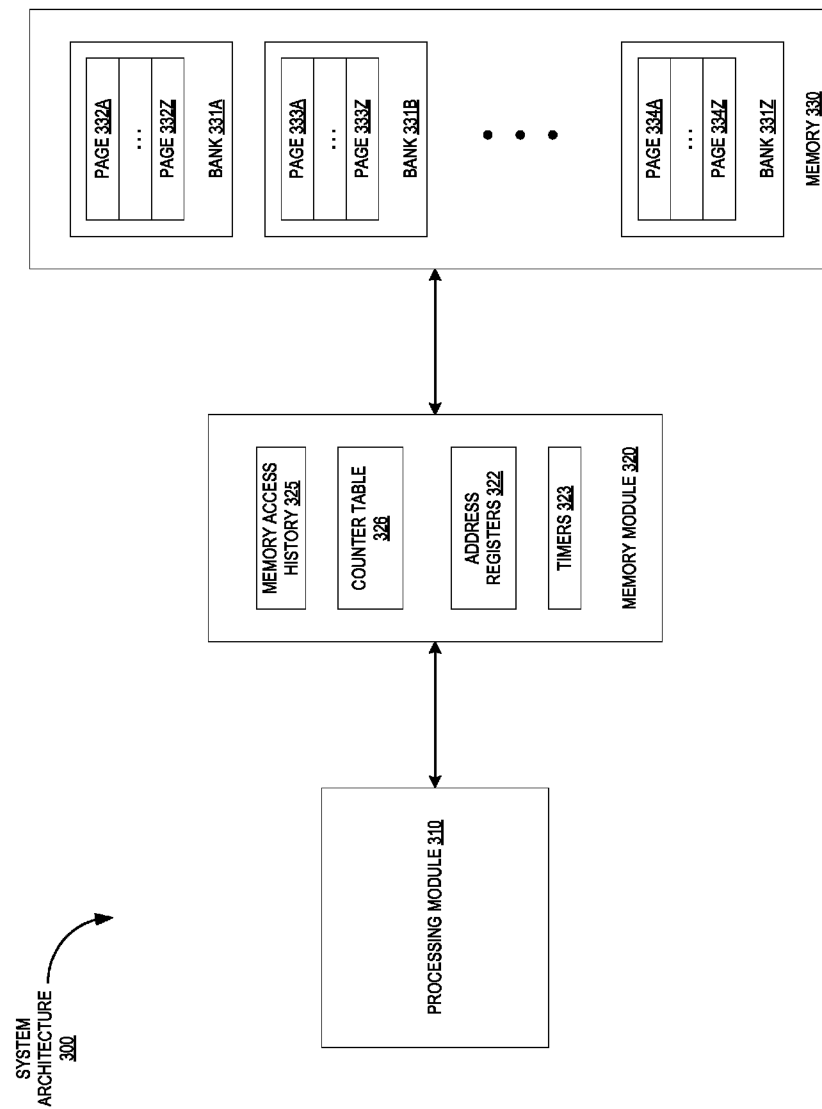
FIG. 3 is a block diagram of a system architecture, according to a further embodiment of the disclosure.

FIG. 3 is a block diagram of a system architecture 300, according to a further embodiment of the disclosure. The system architecture 300 includes a processing module 310, a memory module 320, and a memory 330. In one embodiment, the memory module 320 may be included as a component in the processing module 310 (e.g., may be part of the processing module 310). For example, the memory module 320 may be a processing logic that may comprise hardware (e.g., circuitry, dedicated logic, programmable logic, microcode, etc.), software (such as instructions run on a processing device), firmware, or a combination thereof, within the processing module 310. In another embodiment, the memory module 320 may be may comprise hardware (e.g., circuitry, dedicated logic, programmable logic, microcode, etc.), software (such as instructions run on a processing device), firmware, or a combination thereof, that is separate from the processing module 310 (e.g., may be a separate circuit).

Processing module 310 may execute instructions of one or more applications (e.g., a program, a software module, a software component, and/or other software element). The application may include a plurality of instructions. The instructions may include program code to cause processing module 310 to perform activities such as, but not limited to, reading data, writing data, processing data, formulating data, converting data, transforming data, etc. The instructions in the application may be divided into blocks of instructions (e.g., a series or group of instructions), such as instruction blocks. The instructions and/or instruction blocks of the application may include a variety of different instructions (e.g., program instructions). The processing module 310, as one illustrative example, may include a complex instruction set computer (CISC) microprocessor, a reduced instruction set computing (RISC) microprocessor, a very long instruction word (VLIW) microprocessor, a multi-core processor, a multithreaded processor, an ultra-low voltage processor, an embedded processor, a processor implementing a combination of instruction sets, and/or any other processor device, such as a digital signal processor, for example. The processing module 310 may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processing module 310 may be from another company, such as ARM Holdings, Ltd, MIPS, etc. The processing module 310 may be a special-purpose processor, such as, for example, a network or communication processor, compression engine, graphics processor, co-processor, embedded processor, an application specific integrated circuit (ASIC), a field programmable gate array (FPGA), a digital signal processor (DSP), or the like. The processing module 310 may be implemented on one or more chips. The processing module 310 may be a part of and/or may be implemented on one or more substrates using any of a number of process technologies, such as, for example, BiCMOS, CMOS, or NMOS.

The memory 330 may one or more components, gates, processing logic, circuits, and/or other hardware that may store data. In one embodiment, the memory 330 may be a random-access device that (such as a random-access memory (RAM)) that allows stored data to be accessed directly in any random order. In one embodiment, the memory 330 may be a volatile memory. The memory 330 may also be referred to as main memory. The memory 330 may include multiple banks 331A through 331Z. Each of the banks 331A through 331Z includes multiple pages. It should be understood that the memory 330 may include any number of banks (e.g., may include 16 banks, 32 banks, 64 banks, etc.). It should also be understood that each bank may include any number of pages (e.g., may include 1024 pages, 2048 pages, etc.). In one embodiment, the pages of the memory 330 (e.g., pages 332A through 332Z) may include instructions of an application that are executed by the processing module 310. In another embodiment, the pages of the memory 330 (e.g., pages 334A through 334Z) may include data that is used by the instructions of the application.

In one embodiment, the memory module 320 may be processing logic that may comprise hardware (e.g., circuitry, dedicated logic, programmable logic, microcode, etc.), software (such as instructions run on a processing device), firmware, or a combination thereof, that may allow the processing module 310 to access and/or use the memory 330. The memory module 320 allows the processing module 310 to read and/or write data to the pages (e.g., page 334A) in the banks (e.g., bank 331B) of the memory 330. The memory module 320 includes memory access history 325, counter table 326, a plurality of address registers 322, and a plurality of timers 323. The memory module 320 may also be referred to as a memory controller. In one embodiment, the memory module 320 may open a page within one of the banks 331A through 331Z to read data from and/or write data to the page. In another embodiment, each bank may have multiple pages open at the same time. For example, bank 331Z may have pages 334A and 334Z open at the same time. As discussed above, an open page policy or a close page policy may be applied to the pages and/or banks in the memory 330. When the memory module 320 uses an open page policy, a page is kept open until a page miss occur. When the memory module 320 uses a close page policy, a page is closed after it has been accessed.

In one embodiment, the memory module 320 may track the memory accesses (e.g., pages read and/or written) from the processing device using the memory access history 325. The memory access history 325 may indicate a sequence of page hits and/or page misses for memory accesses to the memory. For example, the memory access history 325 may indicate that a first memory access was a page hit, a second memory access was a page hit, a third memory access was a page miss, etc. In one embodiment, the memory access history 325 may be a bit string, where a "1" in the bit string indicates a page hit and a "0" in the bit string indicates a page miss. For example, the bit string "01011000" may indicate a first memory access that was a page miss, followed by a second memory access that was a page hit, followed by a third memory access that was a page miss, followed by a fourth memory access that was a page hit, followed by a fifth memory access that was a page hit, followed by a sixth memory access that was a page miss, followed by a seventh memory access that was a page miss, and followed by an eighth memory access that was a page miss. The memory access history 325 may track any number of memory accesses. For example, the memory access history 325 may track the last sixteen, thirty-two, one hundred, etc., memory accesses and whether the memory accesses were pages hits or page misses.

Figure 4:
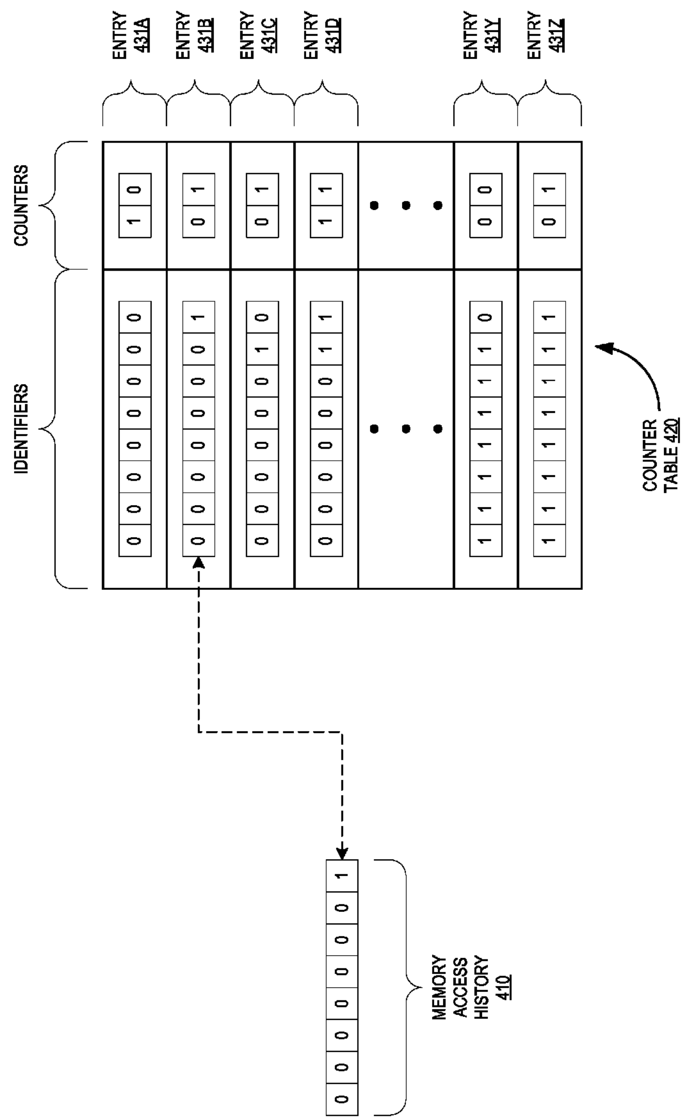
FIG. 4 is a block diagram illustrating a memory access history and a counter table, according to one embodiment of the disclosure.

In one embodiment, the memory module 320 may use the memory access history 325 to identify a counter from the counter table 326. The counter table 326 may include multiple entries (as illustrated in FIG. 4). Each entry may include an identifier and a counter associated with the identifier. The memory access history 325 may be used to identify one of the entries and the counter associated with the identified entry. For example, if each entry in the counter table 226 may include a bit string (e.g., an identifier) and a 2-bit saturating counter associated with the bit string. When accessing (e.g., reading from and/or writing to) the pages (e.g., pages 332A through 332Z, pages 333A through 333Z, etc.) in the memory 330, the memory module 320 may use the memory access history to identify an entry in the table (e.g., identify an entry that has an identifier that matches the memory access history 325). The memory module 320 may determine the value of the counter for the identifier entry in the table. In one embodiment, if the counter is above a threshold value (e.g., greater than the 2-bit number "01") the memory module 320 may predict that the next memory access will be a page hit. If the memory module 320 predicts that the next memory access will be a page hit, the memory module 320 may use an open page policy for the next memory access (e.g., the next read and/or write to a page) to the memory 330 and may keep one or more pages in the memory 330 open. In another embodiment, if the counter is less than or equal to a (e.g., less than or equal to the 2-bit number "01"), the memory module 320 may predict that the next memory access will be a page miss. If the memory module 320 predicts that the next memory access will be a page miss, the memory module 320 may use a close page policy for the next memory access to the memory 330 and may close one or more open pages in the memory 330. In other embodiments, the memory module may use a close page policy of the counter is above the threshold value and may use an open page policy if the counter is less than or equal to the threshold value.

In one embodiment, the memory module 320 may also update the memory access history 325 based on whether the next memory access was a page miss or a page hit. For example, if the memory access history 325 is the bit string "0011" and the next memory access is a page hit, the memory module 320 may left shift a "1" into the bit string to indicate that a page hit occurred (e.g., may update the bit string to "0111"). In another example, if the memory access history 325 is the bit string "0010" and the next memory access is a page miss, the memory module 320 may left shift a "0" into the bit string to indicate that a page miss occurred (e.g., may update the bit string to "0100"). In another embodiment, the memory module 320 may update the memory access history 325 based on the predicted memory access instead of the actual memory access. For example, if the memory access history 325 is the bit string "0100" and the memory module 320 predicts that the next memory access will a page hit, the memory module 320 may left shift a "1" into the bit string even though the next memory access may not result in a page hit (e.g., may update the bit string to "1001").

In one embodiment, when the memory module 320 predicts that the next memory access will be a page hit or a page miss based on a counter for an entry (identified based on the memory access history 325) in the counter table 326, the memory module 320 may track the next memory access that occurs to determine whether the next memory access was a page hit. If the next memory access was a page hit, then the memory module 320 may increment the counter for the entry in the counter table 326. If the next memory access was a page miss, then the memory module 320 may decrement the counter for the entry in the counter table 326. As discussed above, the counter may be a saturating counter (e.g., a counter that may not increase past a certain value or that has a maximum value and/or a counter that may not decrease past a certain value or that has a minimum value).

As discussed above, the memory module 320 may update the memory access history 325 based on the prediction of whether the next memory access will be a page hit or a page miss, or based on the actual result of the next memory access (e.g., whether the next access and an actual page hit or an actual page miss). Because the memory access history 325 may be updated, the memory module 320 may store a copy of the memory access history 325 before it is updated, so that the memory module 320 may locate the correct entry in the counter table 326 so that the correct counter is updated with the actual result of the next memory access. For example, if the memory access history 325 is the bit string "0001" and the counter in the entry identified by the bit string "0001" has predicts that the next memory access will be a page hit the memory module 320 should update the counter with the actual result of the next memory access. Because the memory access history 325 may be updated by the time the next memory access occurs, the memory module 320 may not be able to use the current memory access history 325 to identify the entry and the associated counter that was used to make the prediction. The memory module 320 may use the copy of the memory access history 325 before it is updated (e.g., the previous memory access history) to identify the correct counter to update.

In one embodiment, the memory module 320 may reset one or more of the counters in the counter table 326. Resetting the counters in the counter table 326 may allow the memory module 320 to more accurately determine the hit rate for different applications and/or different blocks of instructions in an application.

In one embodiment, predicting page hits, predicting page misses, and/or switching between an open page policy and a close page policy the memory module 320 may allow the processing module 310 to executing instructions more quickly or more efficiently for different applications or different blocks of instructions in an application because the memory module 320 may be able to reduce the amount of time to access pages in memory 330. In one embodiment, the memory module 320 may apply a different policy (e.g., an open page policy or close page policy) to each bank in the memory 330. In another embodiment, the memory module 320 may use a different threshold (e.g., a different threshold value for the counters in the counter table 326) for different banks in the memory 330.

In another embodiment, the memory module 320 may override an open page policy or a close page policy based on pending memory accesses. The memory module 320 may include a buffer and/or a queue (not shown in the figures) of pending memory access requests received from the processing module 310. If a pending memory access request will cause a page miss for a bank in the memory 330, the memory module 320 may close the current open page for the bank, even though the memory module 320 is applying or using an open page policy for accessing memory 330. If a pending memory access request will access a currently open page in a bank in the memory 330, the memory module 320 may keep the currently open page for the bank open, even though the memory module 320 is applying or using a close page policy for accessing memory 330.

In one embodiment, the memory module 320 may also use timers 173 to determine whether an open page has been accessed during a period of time. For example, the memory module 320 may use a timer from the timers 173 to determine whether page 184A (which may be currently open) has been accessed in the last 10 milliseconds and the memory module 320 may close the page. In other embodiments, any duration or period of time may be used. In one embodiment, the timers 173 may include one timer for each bank in the memory 330 (e.g., each bank may be associated with a timer).

FIG. 4 is a block diagram illustrating a memory access history 410 and a counter table 420, according to one embodiment of the present disclosure. As discussed above in conjunction with FIG. 3, the memory access history 410 may indicate a history of memory accesses to a memory. For example, the memory access history 410 may indicate a sequence of page hits and/or page misses that occurred when a processing module (e.g., a processing device) accessed the memory. As illustrated in FIG. 4, the memory access history 410 is an 8-bit bit string. The 0's in the memory access history 410 indicate that a page miss occurred and the 1's in the memory access history 410 indicate that a page hit occurred. Although the memory access history 410 illustrated in FIG. 4 is an 8-bit bit string, other embodiments may use different size bit strings or may represent the history of memory access using different values or representations. For example, the memory access history 410 may be a text string where "0" indicates a page hit and "X" indicates a page miss.

The counter table 420 includes entries 431A through 431Z. Each of the entries 431A through 431Z includes an identifier (e.g., an 8-bit bit string) and a counter. The counter may be associated with the identifier and/or the entry that includes the counter and the identifier. For example, the counter for entry 431A (with the value "10") may be associated with the identifier "00000000" and/or the entry 431A. As discussed above, a memory module may predict whether a next memory access will be a page hit or a page miss based on the memory access history 410 and the counter table 420. The memory module may use the memory access history 410 to identify an entry in the counter table 420. As illustrated in FIG. 4, the memory access history 410 is the bit string "00000001." The memory access history 410 may be used to identify entry 431B which has an identifier ("00000001") that matches the memory access history 410. The counter for the entry 431B has the value "01." As discussed above, the memory module may predict that the next memory access will be a page hit if counter is above a threshold and may predict that the next memory access will be a page miss if the counter is less than or equal to the threshold. Also as discussed above, the threshold may be the value "01." Because the counter for the entry 431B has the value "01" (which is less than or equal to the threshold value), the memory module may predict that the next memory access will be a page miss. The memory module may apply a close page policy when accessing the memory, based on the prediction. After applying the close page policy, the memory module may store a copy of the memory access history 410 (e.g., may store a copy of the memory access history 410 in a register, a cache, etc.).

When the next memory access occurs, the memory module may track the memory access to determine whether the next memory access is a page hit or a page miss. The memory module may update the memory access history 410 based on whether the next memory access is a page hit or a page miss. For example, if the next memory access is a page hit, the memory access history 410 may change to the bit string "00000011" (e.g., a "1" may be left shifted into the memory access history 410 to indicate that the memory access was a page hit. In one embodiment, the memory module may update the counter used to predict whether the next memory access will be a page hit or a page miss before the memory module updates the memory access history 410. In another embodiment, the memory module may update the counter used to predict whether the next memory access will be a page hit or a page miss after the memory module updates the memory access history 410. Because the memory access history 410 has changed from "00000001" to "00000011," the memory module may use the stored copy of the memory access history 410 (e.g., a copy of the memory access history 410 before the memory access history 410 was updated) to identify the entry 431B and the counter for the entry 431B that was used to make the prediction. In addition, because the next memory access was actually a page hit, the counter for the entry 431B may be incremented from "01" to "10.". "11." The memory module may use the updated memory access history 410 (e.g., 00000011) to identify entry 431D and may use the counter (e.g., the counter with the value 11) when predicting whether a subsequent memory access will be a page hit or a page miss.

In one embodiment, the memory access history 410 may be combined with other values and the combined memory access value to identify an entry in the counter table 420. For example, the memory access history 410 may be hashed with a bit string (e.g., a bit value), may be combined with a memory address, etc., to generate a new memory access value. In another example, an operation (e.g., a logical operation such as a logical OR, a logical AND, etc.) may be performed on the memory access history 410 and the bit string to generate and/or compute the new memory access value. The new value may be used to identify the entry in the counter table 420 and the counter for the entry. Combining the memory access history 410 with a bit string (e.g., hashing the memory access history 410 with a memory address) may allow the memory module to access different counters even though the memory access history 410 may be the same at different points in time. For example, if the memory access history 410 is "10101101" and the address of a first page that is being accessed is "10100110" at a first point in time, then the history 410 may be combined with the address to identify a first counter in the counter table 420. If the memory access history 410 is "10101101" and the address of a second page that is being accessed is "10100110" at a second point in time, then the history 410 may be combined with the address to identify a second, different counter in the counter table 420.

Figure 5C:
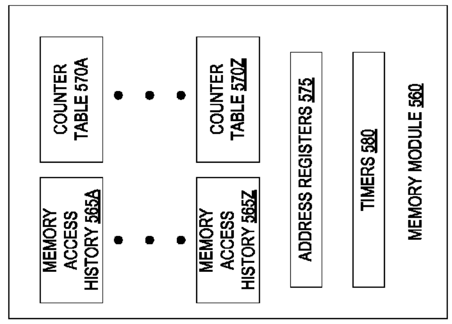
FIG. 5C is a block diagram illustrating a memory module, according to a further embodiment of the disclosure.
Figure 5B:
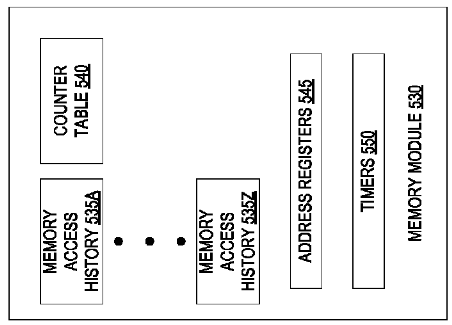
FIG. 5B is a block diagram illustrating a memory module, according to another embodiment of the disclosure.
Figure 5A:
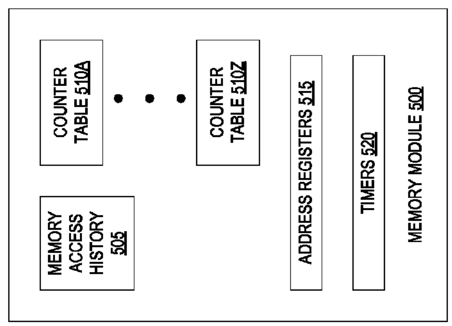
FIG. 5A is a block diagram illustrating a memory module, according to one embodiment of the disclosure.

FIG. 5A is a block diagram illustrating a memory module 500, according to one embodiment of the disclosure. In one embodiment, the memory module 500 may be included as a component in a processing module. For example, the memory module 500 may be a processing logic that may comprise hardware (e.g., circuitry, dedicated logic, programmable logic, microcode, etc.), software (such as instructions run on a processing device), firmware, or a combination thereof, within the processing module. In another embodiment, the memory module 500 may be may comprise hardware (e.g., circuitry, dedicated logic, programmable logic, microcode, etc.), software (such as instructions run on a processing device), firmware, or a combination thereof, that is separate from the processing module (e.g., may be a separate circuit). As discussed above in conjunction with FIGS. 3 and 4, the memory access history 505 may indicate a history of memory accesses to a memory. For example, the memory access history 505 may indicate a sequence of page hits and/or page misses that occurred when a processing module (e.g., a processing device) accessed the memory. The counter tables 510A through 510Z each include multiple entries. Each of the entries may include an identifier (e.g., an 8-bit bit string) and a counter. The counter may be associated with the identifier and/or the entry that includes the counter and the identifier.

The memory module 500 may predict whether a next memory access will be a page hit or a page miss based on the memory access history 505 and the counter tables 510A through 510Z. In one embodiment, each of the counter tables 510A through 510Z may be associated with a bank in a memory. For example, referring to FIG. 1, counter table 510A may be associated with bank 131A, counter table 510Z may be associated with bank 131Z, etc. When accessing the memory, memory module 500 may determine which one of a plurality of banks in the memory is being accessed. The memory module 500 may identify one of the counter tables 510A through 510Z and may use the memory access history 505 to identify an entry in the identified counter table. The memory module 500 may use the identified entry to predict whether a next memory access to the bank in the memory will be a page hit or a page miss.

In one embodiment, the memory module may track the memory access to determine whether the next memory access is a page hit or a page miss when the next memory access occurs. The memory module may update the memory access history 505 and the identified entry in one of the counter tables 510A through 510Z based on whether the next memory access is a page hit or a page miss. As discussed above, the memory module 500 may use a stored copy of the memory access history 505 (before the memory access history 505 is modified) to update the identified entry.

In one embodiment, the memory module 500 may also use the address registers 515 to determine whether a memory access (e.g., a requests to access a page) is a page hit or a page miss. The address registers 515 may store an identifier for the last accessed page for each bank. As discussed above, multiple pages per bank may be open in the memory. In one embodiment, the address registers 515 may store multiple pages for each bank. In one embodiment, the memory module 500 may also use timers 520 to determine whether an open page has been accessed during a period of time. If an open page has been accessed for a threshold period of time, the memory module 500 may close the page.

FIG. 5B is a block diagram illustrating a memory module 530, according to another embodiment of the disclosure. In one embodiment, the memory module 530 may be included as a component in a processing module. For example, the memory module 530 may be a processing logic that may comprise hardware (e.g., circuitry, dedicated logic, programmable logic, microcode, etc.), software (such as instructions run on a processing device), firmware, or a combination thereof, within the processing module. In another embodiment, the memory module 530 may be may comprise hardware (e.g., circuitry, dedicated logic, programmable logic, microcode, etc.), software (such as instructions run on a processing device), firmware, or a combination thereof, that is separate from the processing module (e.g., may be a separate circuit). As discussed above in conjunction with FIGS. 3 and 4, the memory access histories 535A through 535Z may indicate different histories of memory accesses to a memory. In one embodiment, each of the memory access histories 535A through 535Z may be associated with a different bank in the memory. For example, referring to FIG. 1, memory access history 535A may be associated with bank 131A, memory access history 535A may be associated with bank 131Z, etc. When accessing the memory, memory module 500 may determine which one of a plurality of banks in the memory is being accessed. The memory module 530 may identify one of the memory access histories 535A through 535Z and may use the identified memory access history to identify an entry in counter table 540. The counter table 540 includes multiple entries. Each of the entries may include an identifier (e.g., an 8-bit bit string) and a counter. The counter may be associated with the identifier and/or the entry that includes the counter and the identifier.

The memory module 530 may predict whether a next memory access will be a page hit or a page miss based on the identified memory access history (that is associated with the bank that is being accessed) and the counter table 540. When accessing the memory, memory module 530 use the identified memory access history (e.g., the memory access history that is associated with the bank that is being accessed) to identify an entry in the counter table 540. The memory module 530 may use the identified entry to predict whether a next memory access to the bank in the memory will be a page hit or a page miss.

When the next memory access occurs, the memory module may track the memory access to determine whether the next memory access is a page hit or a page miss. The memory module may update the identified memory access history and the identified entry in the counter table 540 based on whether the next memory access is a page hit or a page miss. As discussed above, the memory module 530 may use a stored copies of the memory access histories 535A through 535Z (before memory access histories 535A through 535Z are modified) to update the identified entry.

In one embodiment, the memory module 530 may also use the address registers 545 to determine whether a memory access (e.g., a requests to access a page) is a page hit or a page miss. The address registers 545 may store an identifier for the last accessed page for each bank. As discussed above, multiple pages per bank may be open in the memory. In one embodiment, the address registers 545 may store multiple pages for each bank. In one embodiment, the memory module 530 may also use timers 550 to determine whether an open page has been accessed during a period of time. If an open page has been accessed for a threshold period of time, the memory module 530 may close the page.

FIG. 5C is a block diagram illustrating a memory module 560, according to a further embodiment of the disclosure. In one embodiment, the memory module 530 may be included as a component in a processing module. For example, the memory module 530 may be a processing logic that may comprise hardware (e.g., circuitry, dedicated logic, programmable logic, microcode, etc.), software (such as instructions run on a processing device), firmware, or a combination thereof, within the processing module. In another embodiment, the memory module 530 may be may comprise hardware (e.g., circuitry, dedicated logic, programmable logic, microcode, etc.), software (such as instructions run on a processing device), firmware, or a combination thereof, that is separate from the processing module (e.g., may be a separate circuit). As discussed above in conjunction with FIGS. 3 and 4, the memory access histories 565A through 565Z may indicate different histories of memory accesses to a memory. In one embodiment, each of the memory access histories 565A through 565Z may be associated with a different bank in the memory. For example, referring to FIG. 1, memory access history 565A may be associated with bank 131A, memory access history 565A may be associated with bank 131Z, etc. When accessing the memory, memory module 500 may determine which one of a plurality of banks in the memory is being accessed. In one embodiment, each of the counter tables 570A through 570Z may be associated with a bank in a memory. For example, referring to FIG. 1, counter table 570A may be associated with bank 131A, counter table 570A may be associated with bank 131Z, etc. The memory module 560 may identify one of the counter tables 570A through 570Z based on the bank of memory that is being accessed. The memory module 560 may predict whether a next memory access will be a page hit or a page miss based on the memory access histories 565A through 565Z and the counter tables 570A through 570Z. For example, memory module 500 may determine which one of a plurality of banks in the memory is being accessed. The memory module 500 may identify one of memory access histories 565A through 565 and one of the counter tables 570A through 570Z. The memory module 500 may use the identified memory access history to identify an entry in the identified counter table. The memory module 500 may use the identified entry to predict whether a next memory access to the bank in the memory will be a page hit or a page miss.

When the next memory access occurs, the memory module may track the memory access to determine whether the next memory access is a page hit or a page miss. The memory module may update the identified memory access history and the identified entry based on whether the next memory access is a page hit or a page miss. As discussed above, the memory module 560 may use a stored copies of the memory access histories 565A through 565Z (before memory access histories 565A through 565Z are modified) to update the identified entry.

In one embodiment, the memory module 560 may also use the address registers 575 to determine whether a memory access (e.g., a requests to access a page) is a page hit or a page miss. The address registers 575 may store an identifier for the last accessed page for each bank. As discussed above, multiple pages per bank may be open in the memory. In one embodiment, the address registers 575 may store multiple pages for each bank. In one embodiment, the memory module 560 may also use timers 580 to determine whether an open page has been accessed during a period of time. If an open page has been accessed for a threshold period of time, the memory module 560 may close the page.

Figure 6:
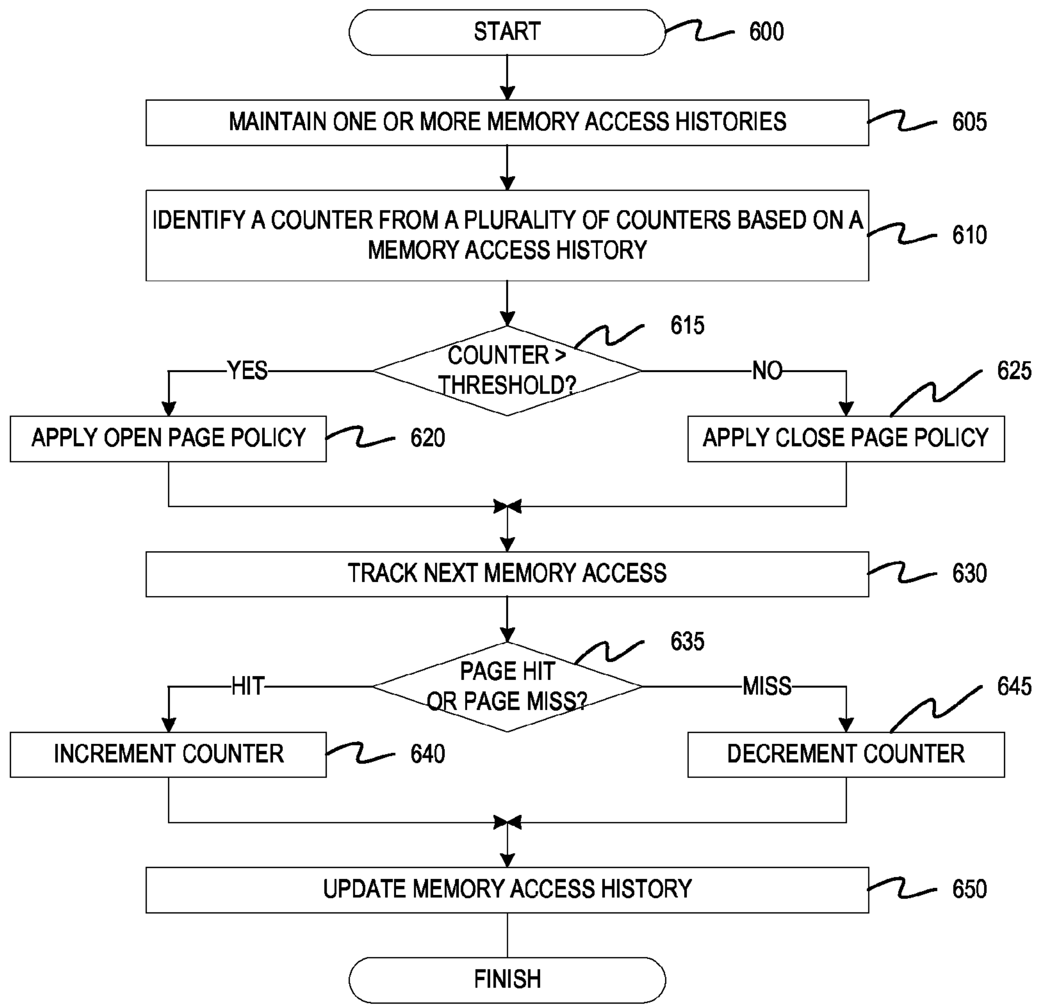
FIG. 6 is a flow diagram illustrating a method of accessing memory, according to another embodiment of the disclosure.

FIG. 6 is a flow diagram illustrating a method 600 of accessing memory, according to another embodiment. Method 600 may be performed by processing logic that may comprise hardware (e.g., circuitry, dedicated logic, programmable logic, microcode, etc.), software (such as instructions run on a processing device), firmware, or a combination thereof. In one embodiment, method 600 may be performed by a memory module, as illustrated in FIGS. 3, 5A, 5B, and 5C. For simplicity of explanation, the method 600 is depicted and described as a series of acts. However, acts in accordance with this disclosure can occur in various orders and/or concurrently and with other acts not presented and described herein. Furthermore, not all illustrated acts may be required to implement the method 600 in accordance with the disclosed subject matter. In addition, those skilled in the art will understand and appreciate that the method 600 could alternatively be represented as a series of interrelated states via a state diagram or events.

Referring to FIG. 6, the method 600 begins at block 605 where the processing logic tracks a plurality of memory accesses and maintains or more memory access histories. For example, the processing logic may track the total number of memory access to a bank in a memory or to multiple banks in the memory. The processing logic may update the memory access history to indicate whether the memory accesses were page hits or page misses. For example, as discussed above in conjunction with FIG. 4, the processing logic may left shift a “1” into a bit string to indicate that a page hit occurred and may left shift a “0” into the bit string to indicate that a page miss occurred. In one embodiment, there may multiple memory access histories (e.g., one memory access history per bank in the memory, as illustrated in FIGS. 5B and 5C). At block 610, the processing logic may identify a counter from a plurality of counters based on a memory access history. For example, as illustrated in FIG. 4, the processing logic may identify an entry that has an identifier that matches the memory access history. The processing logic may identify the counter for the identified entry. The processing logic determines whether the counter is greater than a threshold (block 615). For example, as illustrated in FIG. 4, the processing logic may determine whether the counter is greater than the bit value “01.” If the counter is greater than the threshold (e.g., threshold value), the processing logic may predict that the next memory access will be a page hit and may apply an open page policy when accessing the memory at block 620. If the counter is less than or equal to the threshold (e.g., threshold value), the processing logic may predict that the next memory access will be a page miss and may apply a close page policy when accessing the memory at block 625.

At block 630, the processing logic tracks the next memory access that occurs. The processing logic analyzes the next memory access to determine whether the next memory access was actually a page hit or was actually a page miss at block 635. If the next memory access was a page hit, the processing logic may increment the counter that was used to make the prediction (block 640). If the next memory access was a page miss, the processing logic may decrement the counter that was used to make the prediction (block 645). At block 650, the processing logic updates the memory access history that was used to identify the counter from the plurality of counters. For example, as discussed in conjunction with FIG. 4, the processing logic may left shift a “1” into a bit string if next memory access was an actual page hit and may left shift a “0” into the bit string if the next memory access was an actual page miss. After block 650, the method 600 ends.

Figure 7:
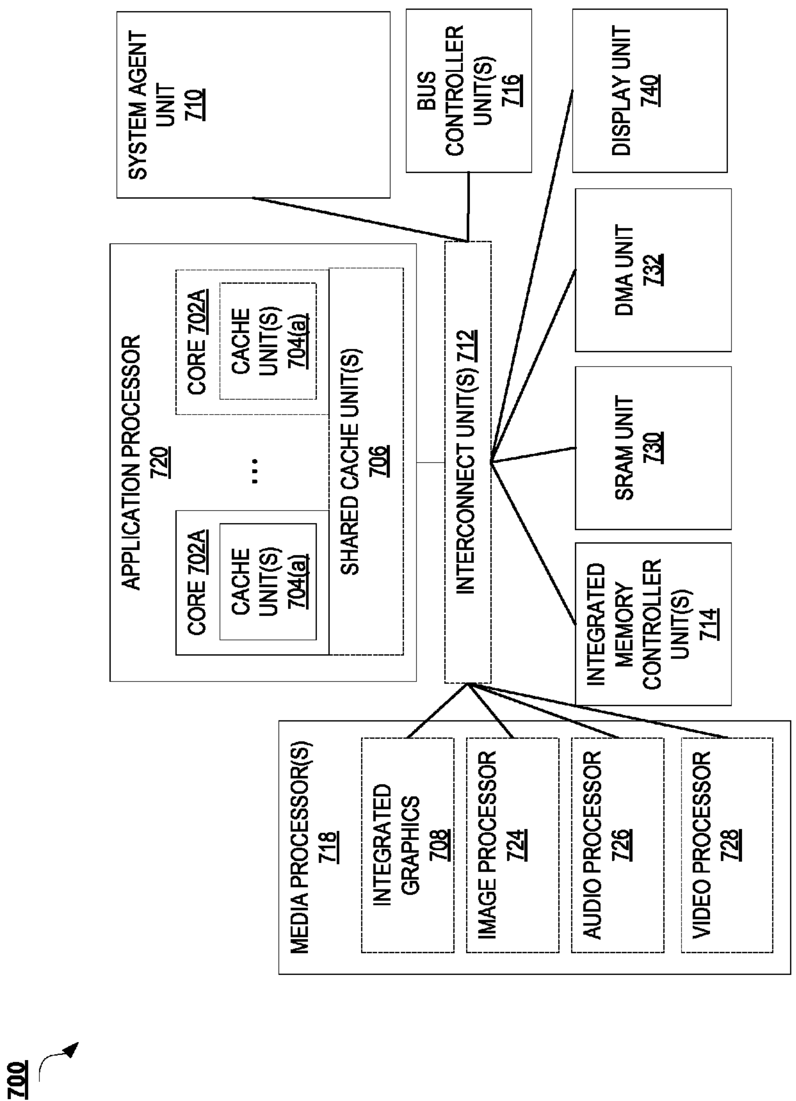
FIG. 7 is a block diagram of a system on chip (SoC), in accordance with an embodiment of the present disclosure.

FIG. 7 is a block diagram of a SoC 700, in accordance with an embodiment of the present disclosure. Dashed lined boxes are optional features on more advanced SoCs. In FIG. 7, an interconnect unit(s) 712 is coupled to: an application processor 720 which includes a set of one or more cores 702A-N and shared cache unit(s) 706; a system agent unit 710; a bus controller unit(s) 716; an integrated memory controller unit(s) 714; a set or one or more media processors 718 which may include integrated graphics logic 708, an image processor 724 for providing still and/or video camera functionality, an audio processor 726 for providing hardware audio acceleration, and a video processor 728 for providing video encode/decode acceleration; an static random access memory (SRAM) unit 730; a direct memory access (DMA) unit 732; and a display unit 740 for coupling to one or more external displays. In one embodiment, a memory module (as discussed in conjunction with FIGS. 1A, 1B, 3, 5A, 5B, and 5C) may be included in the integrated memory controller unit(s) 714. In another embodiment, the memory module may be included in one or more other components of the SoC 700 that may be used to access and/or control a memory.

The memory hierarchy includes one or more levels of cache within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof.

In some embodiments, one or more of the cores 702A-N are capable of multithreading.

The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture and/or instruction set. For example, some of the cores 702A-N may be in order while others are out-of-order. As another example, two or more of the cores 702A-N may be capable of execution the same instruction set, while others may be capable of executing only a subset of that instruction set or a different instruction set.

The application processor 720 may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the application processor 720 may be from another company, such as ARM Holdings, Ltd, MIPS, etc. The application processor 720 may be a special-purpose processor, such as, for example, a network or communication processor, compression engine, graphics processor, co-processor, embedded processor, or the like. The application processor 720 may be implemented on one or more chips. The application processor 720 may be a part of and/or may be implemented on one or more substrates using any of a number of process technologies, such as, for example, BiCMOS, CMOS, or NMOS.

Figure 8:
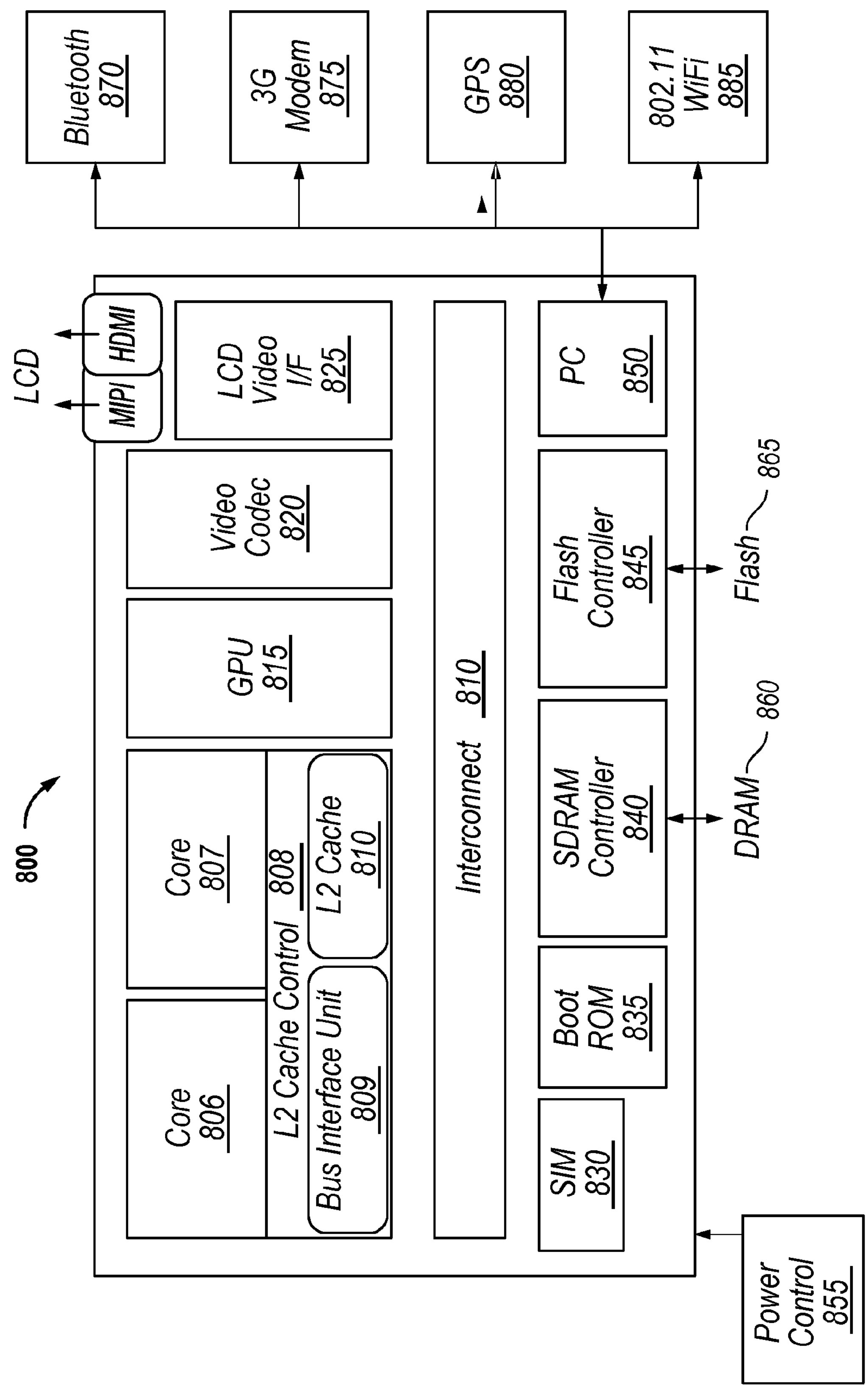
FIG. 8 is a block diagram of an embodiment of a system on-chip (SOC) design, in accordance with another embodiment of the present disclosure.

FIG. 8 is a block diagram of an embodiment of a system on-chip (SOC) design, in accordance with another embodiment of the present disclosure. As a specific illustrative example, SOC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network. In one embodiment, a memory module (as discussed in conjunction with FIGS. 1A, 1B, 3, 5A, 5B, and 5C) may be included in the SDRAM controller 840. In another embodiment, the memory module may be included in one or more other components of the SoC 800 that may be used to access and/or control a memory, such as DRAM 860.

Here, SOC 800 includes 2 cores—806 and 807. Cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800. Interconnect 810 includes an on-chip interconnect, such as an IOSF, AMBA, or other interconnect discussed above, which potentially implements one or more aspects of the described disclosure.

Interface 810 provides communication channels to the other components, such as a Subscriber Identity Module (SIM) 830 to interface with a SIM card, a boot rom 835 to hold boot code for execution by cores 806 and 807 to initialize and boot SOC 800, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the disclosure described herein.

In addition, the system 800 illustrates peripherals for communication, such as a Bluetooth module 870, 3G modem 875, GPS 880, and Wi-Fi 885. Note as stated above, a UE includes a radio for communication. As a result, these peripheral communication modules are not all required. However, in a UE, some form a radio for external communication is to be included.

Figure 9:
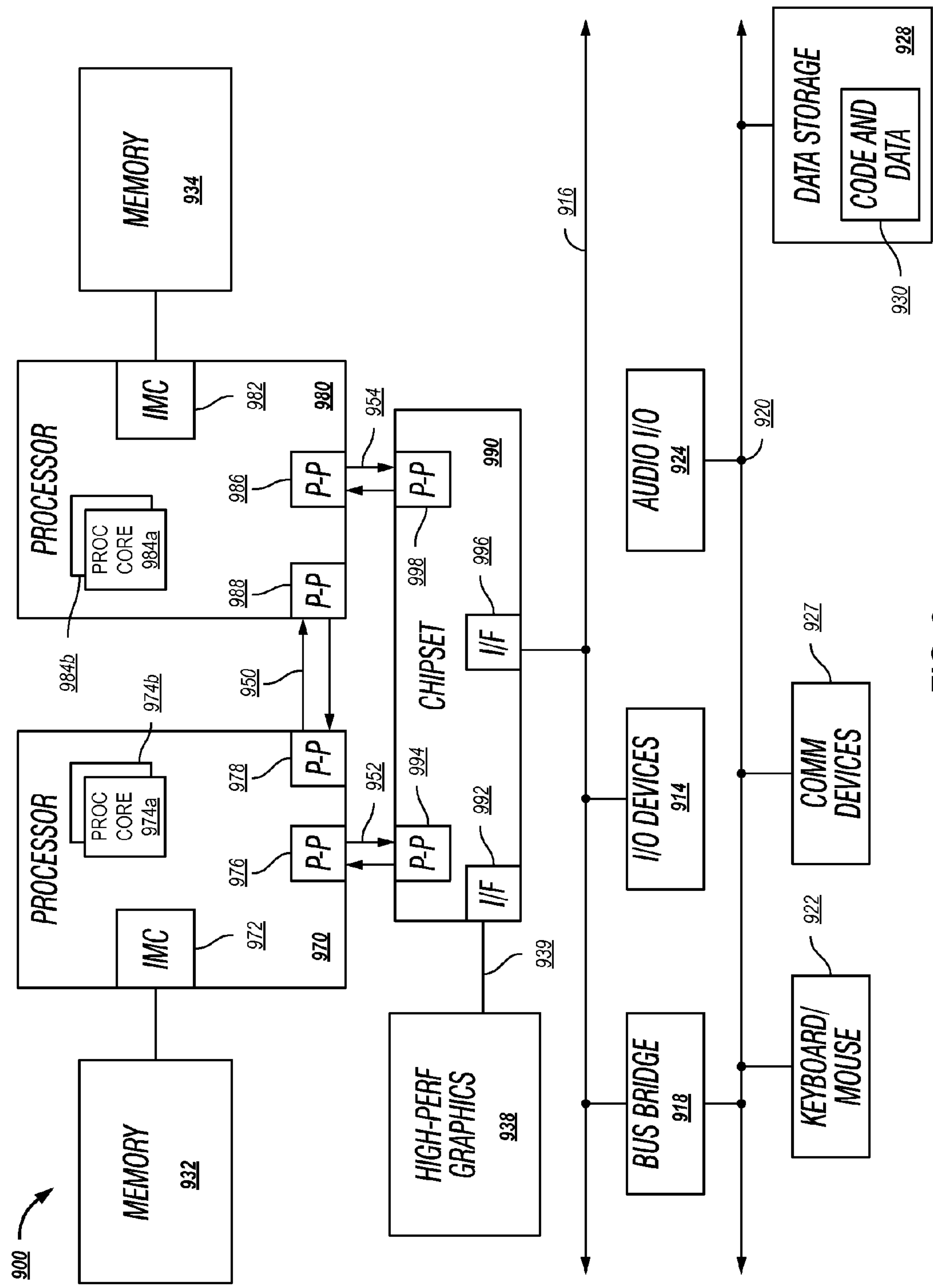
FIG. 9 is a block diagram of a computer system, according to one embodiment of the present disclosure.

FIG. 9 is a block diagram of a multiprocessor system 900, in accordance with one embodiment of the present disclosure. As shown in FIG. 9, multiprocessor system 900 is a point-to-point interconnect system, and includes a first processor 970 and a second processor 980 coupled via a point-to-point interconnect 950. Each of processors 970 and 980 may be some version of the processing device 602 of FIG. 6. As shown in FIG. 9, each of processors 970 and 980 may be multicore processors, including first and second processor cores (i.e., processor cores 974*a* and 974*b* and processor cores 984*a* and 984*b*), although potentially many more cores may be present in the processors. A processor core may also be referred to as an execution core. The processors each may include hybrid write mode logics in accordance with an embodiment of the present. In one embodiment, a memory module (as discussed in conjunction with FIGS. 1A, 1B, 3, 5A, 5B, and 5C) may be included in IMCs 972 and 982 of the processors 970 and 980. In another embodiment, the memory module may be included in one or more other components of the processors 970 and 980 that may be used to access and/or control a memory, such as memories 932 and/or 934.

While shown with two processors 970, 980, it is to be understood that the scope of the present disclosure is not so limited. In other implementations, one or more additional processors may be present in a given processor.

Processors 970 and 980 are shown including integrated memory controller units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, and 998. Chipset 990 may also exchange information with a high-performance graphics circuit 938 via a high-performance graphics interface 939.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present disclosure is not so limited.

As shown in FIG. 9, various I/O devices 914 may be coupled to first bus 916, along with a bus bridge 918 which couples first bus 916 to a second bus 920. In one embodiment, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to second bus 920. Note that other architectures are possible. For example, instead of the point-to-point architecture of FIG. 9, a system may implement a multi-drop bus or other such architecture.

Figure 10:
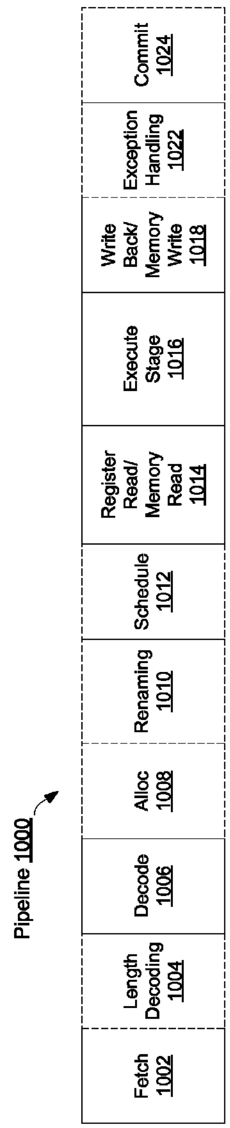
FIG. 10 is a block diagram illustrating an in-order pipeline and a register renaming stage, out-of-order issue/execution pipeline implemented by a processor core, in accordance with one embodiment of the present disclosure.
Figure 11:
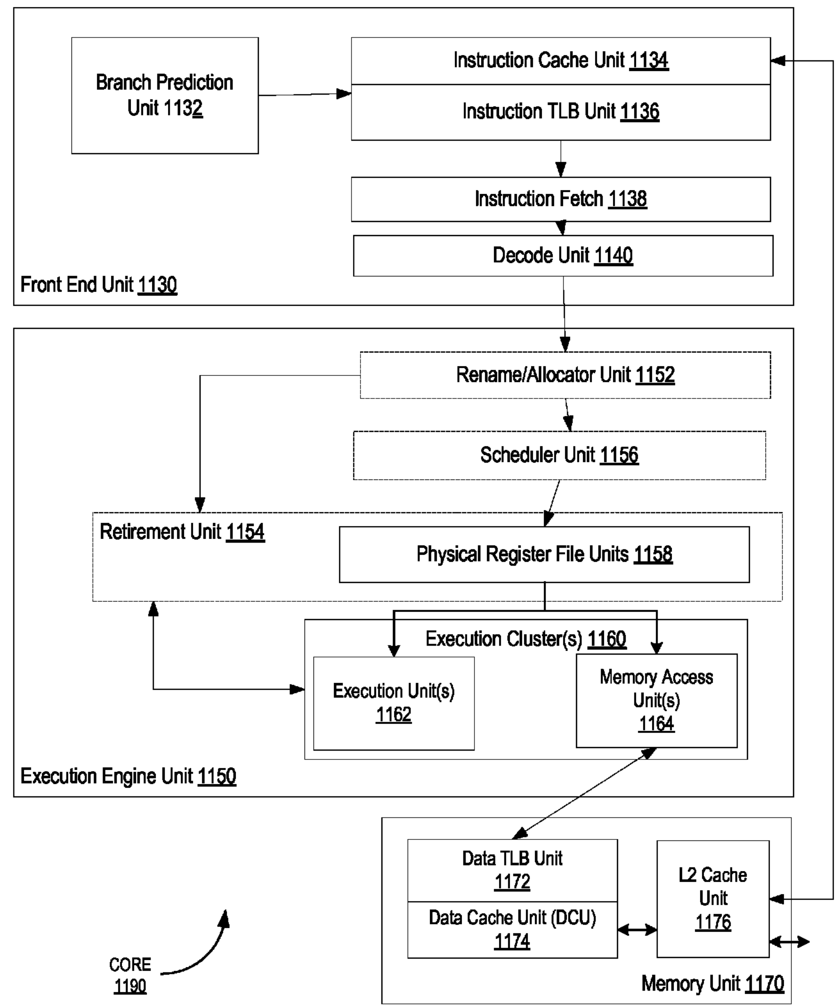
FIG. 11 is a block diagram illustrating an in-order architecture core and a register renaming logic, out-of-order issue/execution logic to be included in a processor according to at least one embodiment of the disclosure.

FIG. 10 is a block diagram illustrating an in-order pipeline and a register renaming stage, out-of-order issue/execution pipeline implemented by core 1190 of FIG. 11 (which may be include in a processor), in accordance with one embodiment of the present disclosure. FIG. 11 is a block diagram illustrating an in-order architecture core and a register renaming logic, out-of-order issue/execution logic that may be included in a processor according to at least one embodiment of the disclosure. The solid lined boxes in FIG. 10 illustrate the in-order pipeline, while the dashed lined boxes illustrates the register renaming, out-of-order issue/execution pipeline. Similarly, the solid lined boxes in FIG. 10 illustrate the in-order architecture logic, while the dashed lined boxes illustrates the register renaming logic and out-of-order issue/execution logic. In FIG. 10, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1010, an execute stage 1016, a write back/memory write stage 1018, an exception handling stage 1022, and a commit stage 1024. In one embodiment, a memory module (as discussed in conjunction with FIGS. 1A, 1B, 3, 5A, 5B, and 5C) may be used by processing core 1190 (illustrated in FIG. 11) at one or more of the register read/memory read stage 1014 and the write back/memory write stage 1018.

FIG. 11 is a block diagram illustrating an in-order architecture core and a register renaming logic, out-of-order issue/execution logic that may be included in a processor according to at least one embodiment of the disclosure. In FIG. 11, arrows denote a coupling between two or more units and the direction of the arrow indicates a direction of data flow between those units. FIG. 11 shows processor core 1190 including a front end unit 1130 coupled to an execution engine unit 1150, and both are coupled to a memory unit 1170.

The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 1134 is further coupled to a level 2 (L2) cache unit 1176 in the memory unit 1170. The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed)—etc. The physical register file(s) unit(s) 1158 is overlapped by the retirement unit 1154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1154 and the physical register file(s) unit(s) 1158 are coupled to the execution cluster(s) 1160. The execution cluster(s) 1160 includes a set of one or more execution units 162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order. In one embodiment, a memory module (as discussed in conjunction with FIGS. 1A, 1B, 3, 5A, 5B, and 5C) may be included in the memory access unit(s) 1164 of the core 1190. In another embodiment, the memory module may be included in one or more other components of the core 1190 that may be used to access and/or control a memory.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The L2 cache unit 1176 is coupled to one or more other levels of cache and eventually to a main memory.

By way of example, the exemplary register renaming, out-of-order issue/execution core architecture may implement the pipeline 1000 as follows: 1) the instruction fetch 1138 performs the fetch and length decoding stages 1002 and 1004; 2) the decode unit 1140 performs the decode stage 1006; 3) the rename/allocator unit 1152 performs the allocation stage 1008 and renaming stage 1010; 4) the scheduler unit(s) 1156 performs the schedule stage 1012; 5) the physical register file(s) unit(s) 1158 and the memory unit 1170 perform the register read/memory read stage 1010; the execution cluster 1160 perform the execute stage 1016; 6) the memory unit 1170 and the physical register file(s) unit(s) 1158 perform the write back/memory write stage 1018; 7) various units may be involved in the exception handling stage 1022; and 8) the retirement unit 1154 and the physical register file(s) unit(s) 1158 perform the commit stage 1024.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 12:
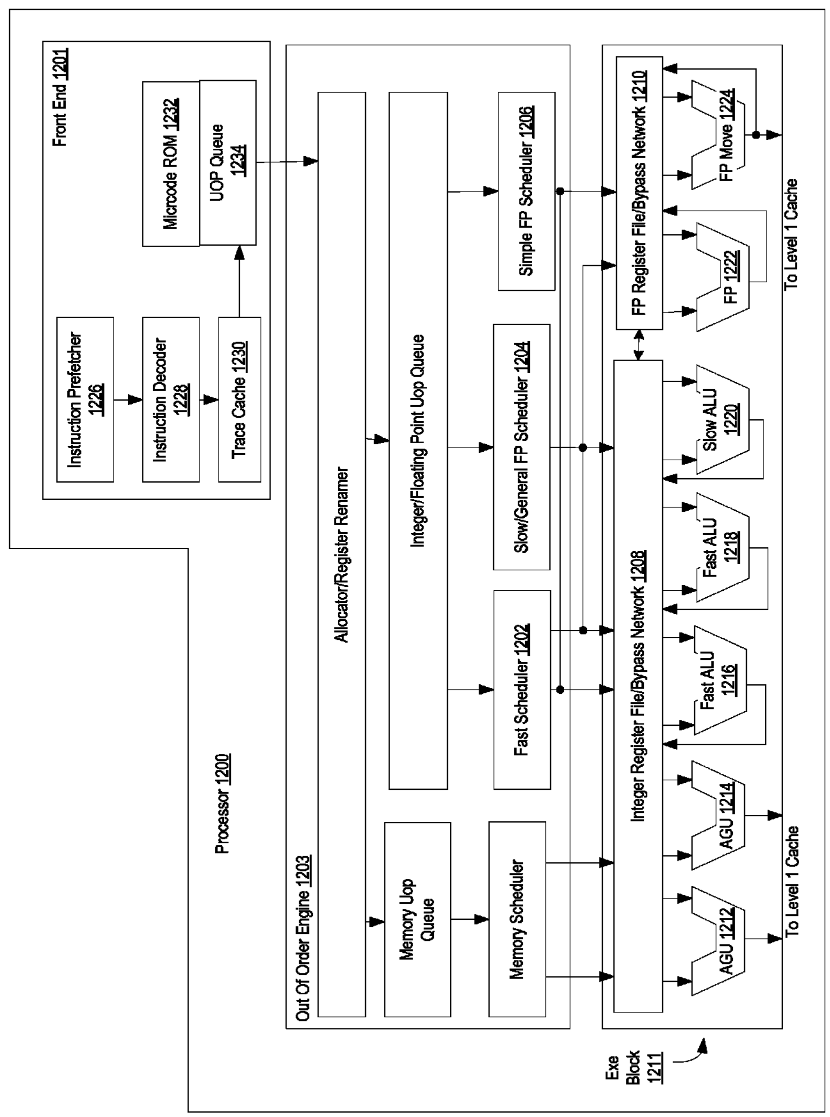
FIG. 12 is a block diagram of the micro-architecture for a processor that includes logic circuits to perform instructions, in accordance with one embodiment of the present invention.

FIG. 12 is a block diagram of the micro-architecture for a processor 1200 that includes logic circuits to perform instructions in accordance with one embodiment of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1201 is the part of the processor 1200 that fetches instructions to be executed and prepares them to be used later in the processor pipeline. The front end 1201 may include several units. In one embodiment, the instruction prefetcher 1226 fetches instructions from memory and feeds them to an instruction decoder 1228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1230 takes decoded uops and assembles them into program ordered sequences or traces in the uop queue 1234 for execution. When the trace cache 1230 encounters a complex instruction, the microcode ROM 1232 provides the uops needed to complete the operation.

Some instructions are converted into a single micro-op, whereas others need several micro-ops to complete the full operation. In one embodiment, if more than four micro-ops are needed to complete an instruction, the decoder 1228 accesses the microcode ROM 1232 to do the instruction. For one embodiment, an instruction can be decoded into a small number of micro ops for processing at the instruction decoder 1228. In another embodiment, an instruction can be stored within the microcode ROM 1232 should a number of micro-ops be needed to accomplish the operation. The trace cache 1230 refers to an entry point programmable logic array (PLA) to determine a correct micro-instruction pointer for reading the micro-code sequences to complete one or more instructions in accordance with one embodiment from the micro-code ROM 1232. After the microcode ROM 1232 finishes sequencing micro-ops for an instruction, the front end 1201 of the machine resumes fetching micro-ops from the trace cache 1230.

The out-of-order execution engine 1203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1202, slow/general floating point scheduler 1204, and simple floating point scheduler 1206. The uop schedulers 1202, 1204, 1206, determine when a uop is ready to execute based on the readiness of their dependent input register operand sources and the availability of the execution resources the uops need to complete their operation. The fast scheduler 1202 of one embodiment can schedule on each half of the main clock cycle while the other schedulers can only schedule once per main processor clock cycle. The schedulers arbitrate for the dispatch ports to schedule uops for execution. In one embodiment, a memory module (as discussed in conjunction with FIGS. 1A, 1B, 3, 5A, 5B, and 5C) may be included in the memory scheduler. In another embodiment, the memory module may be included in one or more other components of the processor 1200 that may be used to access and/or control a memory.

Register files 1208, 1210, sit between the schedulers 1202, 1204, 1206, and the execution units 1212, 1214, 1216, 1218, 1220, 1222, and 1224 in the execution block 1211. There is a separate register file 1208, 1210, for integer and floating point operations, respectively. Each register file 1208, 1210, of one embodiment also includes a bypass network that can bypass or forward just completed results that have not yet been written into the register file to new dependent uops. The integer register file 1208 and the floating point register file 1210 are also capable of communicating data with the other. For one embodiment, the integer register file 1208 is split into two separate register files, one register file for the low order 32 bits of data and a second register file for the high order 32 bits of data. The floating point register file 1210 of one embodiment has 128 bit wide entries because floating point instructions typically have operands from 64 to 128 bits in width.

The execution block 1211 contains the execution units 1212, 1214, 1216, 1218, 1220, 1222, 1224, where the instructions are actually executed. This section includes the register files 1208, 1210, that store the integer and floating point data operand values that the micro-instructions need to execute. The processor 1200 of one embodiment is comprised of a number of execution units: address generation unit (AGU) 1212, AGU 1214, fast ALU 1216, fast ALU 1218, slow ALU 1220, floating point ALU 1222, floating point move unit 1224. For one embodiment, the floating point execution blocks 1222, 1224, execute floating point, MMX, SIMD, and SSE, or other operations. The floating point ALU 1222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 1216, 1218. The fast ALUs 1216, 1218, of one embodiment can execute fast operations with an effective latency of half a clock cycle. For one embodiment, most complex integer operations go to the slow ALU 1220 as the slow ALU 1220 includes integer execution hardware for long latency type of operations, such as a multiplier, shifts, flag logic, and branch processing. Memory load/store operations are executed by the AGUs 1212, 1214. For one embodiment, the integer ALUs 1216, 1218, 1220, are described in the context of performing integer operations on 64 bit data operands. In alternative embodiments, the ALUs 1216, 1218, 1220, can be implemented to support a variety of data bits including 16, 32, 128, 256, etc. Similarly, the floating point units 1222, 1224, can be implemented to support a range of operands having bits of various widths. For one embodiment, the floating point units 1222, 1224, can operate on 128 bits wide packed data operands in conjunction with SIMD and multimedia instructions.

In one embodiment, the uops schedulers 1202, 1204, 1206, dispatch dependent operations before the parent load has finished executing. As uops are speculatively scheduled and executed in processor 1200, the processor 1200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 13:
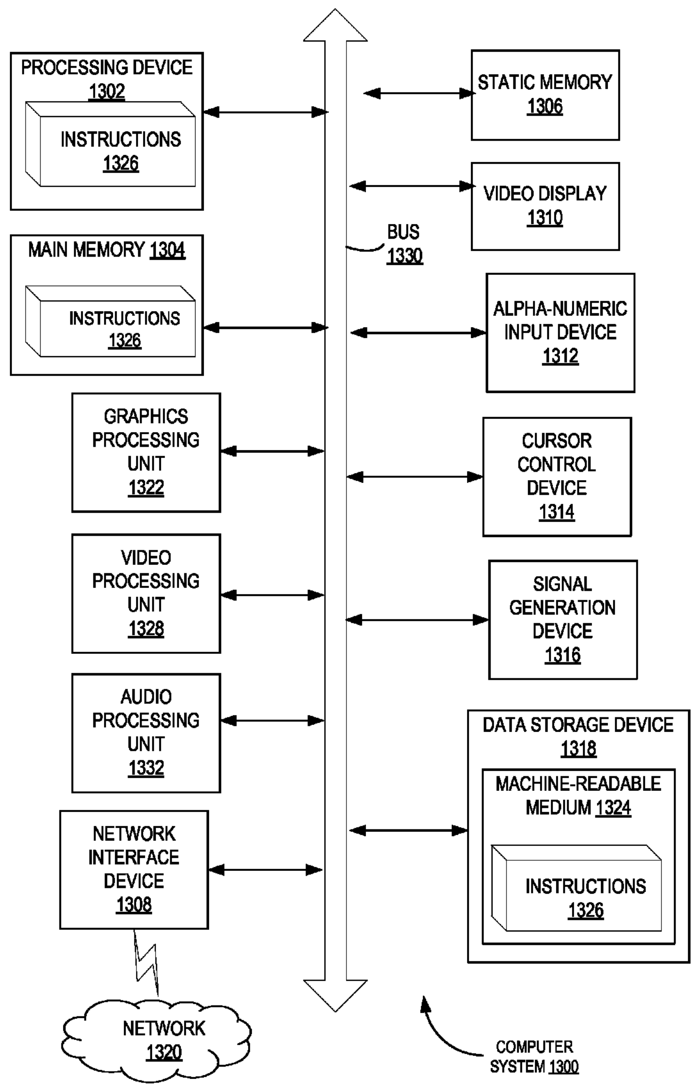
FIG. 13 illustrates a diagrammatic representation of a machine in the example form of a computer system within which a set of instructions, for causing the machine to perform any one or more of the methodologies discussed herein, may be executed.

FIG. 13 illustrates a diagrammatic representation of a machine in the example form of a computer system 1300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one embodiment, processing device 1302 may include one or processing cores. The processing device 1302 is configured to execute the instructions 1326 for performing the operations discussed herein.

The computer system 1300 may further include a network interface device 1308 communicably coupled to a network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a signal generation device 1316 (e.g., a speaker), or other peripheral devices. Furthermore, computer system 1300 may include a graphics processing unit 1322, a video processing unit 1328, and an audio processing unit 1332. In another embodiment, the computer system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI or ISA buses.

The data storage device 1318 may include a computer-readable storage medium 1324 on which is stored instructions 1326 embodying any one or more of the methodologies of functions described herein. The instructions 1326 may also reside, completely or at least partially, within the main memory 1304 and/or within the processing device 1302 during execution thereof by the computer system 1300; the main memory 1304 and the processing device 1302 also constituting computer-readable storage media. In one embodiment, a memory module (as discussed in conjunction with FIGS. 1A, 1B, 3, 5A, 5B, and 5C) may be used by the computer system 1300 when access the main memory 1304.

The computer-readable storage medium 1324 may also be used to store instructions 1326 utilizing the memory module, such as described with respect to FIGS. 1A, 1B, 3, 5A, 5B, and 5C, and/or a software library containing methods that call the above applications. While the computer-readable storage medium 1324 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is method comprising maintaining a memory access history for a memory, identifying a first counter of a plurality of counters based on the memory access history and determining whether the first counter is greater than a threshold. The method further comprises when the first counter is greater than the threshold, applying an open-page policy for accessing the memory and when the first counter is less than or equal to the threshold, applying a close page policy for accessing the memory.

Example 2 may optionally extend the subject matter of example 1. In example 2 the method further comprises maintaining a second memory access history for a memory, identifying a second counter of a second plurality of counters based on the memory access history, determining whether the second counter is greater than a threshold, when the second counter is greater than the threshold, applying an open-page policy for accessing the memory, and when the second counter is less than or equal to the threshold, applying a close page policy for accessing the memory.

Example 3 may optionally extend the subject matter of examples 1-2. In example 3 the method further comprises maintaining a second memory access history for a memory, identifying a second counter of the plurality of counters based on the memory access history, determining whether the second counter is greater than a threshold, when the second counter is greater than the threshold, applying an open-page policy for accessing the memory, and when the second counter is less than or equal to the threshold, applying a close page policy for accessing the memory.

Example 4 may optionally extend the subject matter of examples 1-3. In example 4 the method further comprises updating the memory access history based on additional memory accesses, identifying a second counter of a second plurality of counters based on the updated memory access history, determining whether the second counter is greater than a threshold, when the second counter is greater than the threshold, applying an open-page policy for accessing the memory, and when the second counter is less than or equal to the threshold, applying a close page policy for accessing the memory.

Example 5 may optionally extend the subject matter of examples 1-4. In example 5 the method further comprises determining that a pending memory access will access an open page in the memory and refraining from closing the open page when applying the close page policy for accessing the memory.

Example 6 may optionally extend the subject matter of examples 1-5. In example 6 the method further comprises determining that a pending memory access will not access an open page in the memory and closing the open page when applying the open page policy for accessing the memory.

Example 7 may optionally extend the subject matter of examples 1-6. In example 7 the method further comprises resetting one or more of the counters in the plurality of counters.

Example 8 may optionally extend the subject matter of examples 1-7. In example 8 the method further comprises determining that an open page in the memory has not been accessed for a period of time and closing the open page when applying the open-page policy for accessing the memory.

Example 9 may optionally extend the subject matter of examples 1-8. In example 9 the method further comprises determining whether a subsequent access to the memory is a page hit or a page miss, when the subsequent access to the memory is page hit, updating the memory access history and incrementing the first counter, and when the subsequent access to the memory is page hit, updating the memory access history and decrementing the first counter.

Example 10 is an apparatus comprising, a memory to store data, a processor communicatively coupled to the memory the processor comprising a memory module to: maintain a memory access history for a memory, identify a first counter of a plurality of counters based on the memory access history, determine whether the first counter is greater than a threshold, when the first counter is greater than the threshold, apply an open-page policy for accessing the memory, and when the first counter is less than or equal to the threshold, apply a close page policy for accessing the memory.

Example 11 may optionally extend the subject matter of example 10. In example 11 the memory module is further to maintain a second memory access history for a memory, identifying a second counter of a second plurality of counters based on the memory access history, determine whether the second counter is greater than a threshold, when the second counter is greater than the threshold, apply an open-page policy for accessing the memory and when the second counter is less than or equal to the threshold, apply a close page policy for accessing the memory.

Example 12 may optionally extend the subject matter of examples 10-11. In example 12 the memory module is further to maintain a second memory access history for a memory, identify a second counter of the plurality of counters based on the memory access history, determine whether the second counter is greater than a threshold, when the second counter is greater than the threshold, apply an open-page policy for accessing the memory, and when the second counter is less than or equal to the threshold, apply a close page policy for accessing the memory.

Example 13 may optionally extend the subject matter of examples 10-12. In example 13 the memory module is further to update the memory access history based on additional memory accesses, identify a second counter of a second plurality of counters based on the updated memory access history, determine whether the second counter is greater than a threshold, when the second counter is greater than the threshold, apply an open-page policy for accessing the memory, and when the second counter is less than or equal to the threshold, apply a close page policy for accessing the memory.

Example 14 may optionally extend the subject matter of examples 10-13. In example 14 the memory module is further to determine that a pending memory access will access an open page in the memory and refrain from closing the open page when applying the close page policy for accessing the memory.

Example 15 may optionally extend the subject matter of examples 10-14. In example 15 the memory module is further to determine that a pending memory access will not access an open page in the memory and close the open page when applying the open page policy for accessing the memory.

Example 16 may optionally extend the subject matter of examples 10-15. In example 16 the memory module is further to reset one or more of the counters in the plurality of counters.

Example 17 may optionally extend the subject matter of examples 10-16. In example 17 the memory module is further to determine that an open page in the memory has not been accessed for a period of time and close the open page when applying the open-page policy for accessing the memory.

Example 18 may optionally extend the subject matter of examples 10-17. In example 18 the memory module is further to determine whether a subsequent access to the memory is a page hit or a page miss, when the subsequent access to the memory is page hit, update the memory access history and incrementing the first counter, and when the subsequent access to the memory is page hit, update the memory access history and decrementing the first counter.

Example 19 is a non-transitory machine-readable storage medium including data that, when accessed by a processor, cause the processor to perform operations comprising: maintaining a memory access history for a memory, identifying a first counter of a plurality of counters based on the memory access history, determining whether the first counter is greater than a threshold, when the first counter is greater than the threshold, applying an open-page policy for accessing the memory, and when the first counter is less than or equal to the threshold, applying a close page policy for accessing the memory.

Example 20 may optionally extend the subject matter of example 19. In example 20 the operations further comprise maintaining a second memory access history for a memory, identifying a second counter of a second plurality of counters based on the memory access history, determining whether the second counter is greater than a threshold, when the second counter is greater than the threshold, applying an open-page policy for accessing the memory, and when the second counter is less than or equal to the threshold, applying a close page policy for accessing the memory.

Example 21 may optionally extend the subject matter of examples 19-20. In example 20 the operations further comprise maintaining a second memory access history for a memory, identifying a second counter of the plurality of counters based on the memory access history, determining whether the second counter is greater than a threshold, when the second counter is greater than the threshold, applying an open-page policy for accessing the memory, and when the second counter is less than or equal to the threshold, applying a close page policy for accessing the memory.

Example 22 may optionally extend the subject matter of examples 19-21. In example 22 the operations further comprise updating the memory access history based on additional memory accesses, identifying a second counter of a second plurality of counters based on the updated memory access history, determining whether the second counter is greater than a threshold, when the second counter is greater than the threshold, applying an open-page policy for accessing the memory, and when the second counter is less than or equal to the threshold, applying a close page policy for accessing the memory.

Example 23 may optionally extend the subject matter of examples 19-22. In example 23 the operations further comprise determining that a pending memory access will access an open page in the memory and refraining from closing the open page when applying the close page policy for accessing the memory.

Example 24 may optionally extend the subject matter of examples 19-23. In example 2240 the operations further comprise determining that a pending memory access will not access an open page in the memory and closing the open page when applying the open page policy for accessing the memory.

Example 25 may optionally extend the subject matter of examples 19-24. In example 25 the operations further comprise resetting one or more of the counters in the plurality of counters.

Example 26 may optionally extend the subject matter of examples 19-25. In example 26 the operations further comprise determining that an open page in the memory has not been accessed for a period of time and closing the open page when applying the open-page policy for accessing the memory.

Example 27 may optionally extend the subject matter of examples 19-26. In example 27 the operations further comprise determining whether a subsequent access to the memory is a page hit or a page miss, when the subsequent access to the memory is page hit, updating the memory access history and incrementing the first counter, and when the subsequent access to the memory is page hit, updating the memory access history and decrementing the first counter.

Example 28 is an apparatus comprising: means for maintaining a memory access history for a memory, means for identifying a first counter of a plurality of counters based on the memory access history, means for determining whether the first counter is greater than a threshold, means for applying an open-page policy for accessing the memory when the first counter is greater than the threshold, and means for applying a close page policy for accessing the memory when the first counter is less than or equal to the threshold.

Example 29 may optionally extend the subject matter of example 28. In example 29 the apparatus further comprises means for maintaining a second memory access history for a memory, means for identifying a second counter of a second plurality of counters based on the memory access history, means for determining whether the second counter is greater than a threshold, means for applying an open-page policy for accessing the memory when the second counter is greater than the threshold, and means for applying a close page policy for accessing the memory when the second counter is less than or equal to the threshold.

Example 30 may optionally extend the subject matter of examples 28-29. In example 30 the apparatus further comprises means for maintaining a second memory access history for a memory, identifying a second counter of the plurality of counters based on the memory access history, means for determining whether the second counter is greater than a threshold, means for applying an open-page policy for accessing the memory when the second counter is greater than the threshold, and means for applying a close page policy for accessing the memory when the second counter is less than or equal to the threshold.

Example 31 may optionally extend the subject matter of examples 28-30. In example 31 the apparatus further comprises means for updating the memory access history based on additional memory accesses, means for identifying a second counter of a second plurality of counters based on the updated memory access history, means for determining whether the second counter is greater than a threshold, means for applying an open-page policy for accessing the memory when the second counter is greater than the threshold, and means for applying a close page policy for accessing the memory when the second counter is less than or equal to the threshold.

Example 32 may optionally extend the subject matter of examples 28-31. In example 32 the apparatus further comprises means for determining that a pending memory access will access an open page in the memory and means for refraining from closing the open page when applying the close page policy for accessing the memory.

Example 33 may optionally extend the subject matter of examples 28-32. In example 33 the apparatus further comprises means for determining that a pending memory access will not access an open page in the memory and means for closing the open page when applying the open page policy for accessing the memory.

Example 34 may optionally extend the subject matter of examples 28-33. In example 34 the apparatus further comprises means for resetting one or more of the counters in the plurality of counters.

Example 35 may optionally extend the subject matter of examples 28-34. In example 35 the apparatus further comprises means for determining that an open page in the memory has not been accessed for a period of time and means for closing the open page when applying the open-page policy for accessing the memory.

Example 36 may optionally extend the subject matter of examples 28-35. In example 36 the apparatus further comprises means for determining whether a subsequent access to the memory is a page hit or a page miss, means for updating the memory access history and incrementing the first counter when the subsequent access to the memory is page hit, and means for updating the memory access history and decrementing the first counter when the subsequent access to the memory is page hit.

Example 37 is a method comprising: tracking a plurality of memory accesses to a plurality of pages in a memory with a counter, analyzing the counter to determine a hit rate for the plurality of pages in the memory, determining whether the hit rate is greater than a threshold, when the hit rate is greater than the threshold, applying an open-page policy for accessing the plurality of pages in the memory, and when the hit rate is less than or equal to the threshold, applying a close page policy for accessing the plurality of pages in the memory.

Example 38 may optionally extend the subject matter of example 37. In example 38 the method further comprises maintaining a second counter to track a second plurality of memory accesses to a second plurality of pages in the memory, wherein the plurality of pages are part of a first bank in the memory and wherein the second plurality of pages are part of a second bank in the memory, analyzing the second counter to determine a second hit rate for the second plurality of pages in the memory, determining whether the second hit rate is greater than the threshold, when the second hit rate is greater than the threshold, applying the open-page policy for accessing the memory, and when the second hit rate is less than or equal to the threshold, applying the close page policy for accessing the memory.

Example 39 may optionally extend the subject matter of examples 37-38. In example 39 the method further comprises analyzing the counter to determine a second hit rate, determining whether the second hit rate is greater than the threshold, when the second hit rate is greater than the threshold, applying an open-page policy for accessing the memory, and when the second hit rate is less than or equal to the threshold, applying a close page policy for accessing the memory.

Example 40 may optionally extend the subject matter of examples 37-39. In example 40 the method further comprises determining that a pending memory access will access an open page in the memory and refraining from closing the open page when applying the close page policy for accessing the memory.

Example 41 may optionally extend the subject matter of examples 37-40. In example 41 the method further comprises determining that a pending memory access will not access an open page in the memory and closing the open page when applying the open page policy for accessing the memory.

Example 42 may optionally extend the subject matter of examples 37-41. In example 42 the method further comprises determining that an open page in the memory has not been accessed for a period of time and closing the open page when applying the open-page policy for accessing the memory.

Example 43 may optionally extend the subject matter of examples 37-42. In example 43 the method further comprises determining whether a subsequent access to the memory is a page hit or a page miss, when the subsequent access to the memory is page hit, incrementing the counter, and when the subsequent access to the memory is page hit, decrementing the counter.

Example 44 is an apparatus comprising: a memory to store data, a processor communicatively coupled to the memory the processing comprising a memory module to: track a plurality of memory accesses to a plurality of pages in a memory with a counter, analyze the counter to determine a hit rate for the plurality of pages in the memory, determine whether the hit rate is greater than a threshold, when the hit rate is greater than the threshold, apply an open-page policy for accessing the plurality of pages in the memory, and when the hit rate is less than or equal to the threshold, apply a close page policy for accessing the plurality of pages in the memory.

Example 45 may optionally extend the subject matter of example 44. In example 45 the memory module is further to maintain a second counter to track a second plurality of memory accesses to a second plurality of pages in the memory, wherein the plurality of pages are part of a first bank in the memory and wherein the second plurality of pages are part of a second bank in the memory, analyze the second counter to determine a second hit rate for the second plurality of pages in the memory, determine whether the second hit rate is greater than the threshold, when the second hit rate is greater than the threshold, apply the open-page policy for accessing the memory, and when the second hit rate is less than or equal to the threshold, apply the close page policy for accessing the memory.

Example 46 may optionally extend the subject matter of examples 44-45. In example 46 the memory module is further to track additional memory accesses to pages in a memory with the counter, analyze the counter to determine a second hit rate, determine whether the second hit rate is greater than the threshold, when the second hit rate is greater than the threshold, apply an open-page policy for accessing the memory, and when the second hit rate is less than or equal to the threshold, apply a close page policy for accessing the memory.

Example 4476 may optionally extend the subject matter of examples 44-46. In example 47 the memory module is further to determine that a pending memory access will access an open page in the memory and refrain from closing the open page when apply the close page policy for accessing the memory.

Example 48 may optionally extend the subject matter of examples 44-47. In example 48 the memory module is further to determine that a pending memory access will not access an open page in the memory and close the open page when apply the open page policy for accessing the memory.

Example 49 may optionally extend the subject matter of examples 44-48. In example 49 the memory module is further to determine that an open page in the memory has not been accessed for a period of time and close the open page when apply the open-page policy for accessing the memory.

Example 50 may optionally extend the subject matter of examples 44-49. In example 50 the memory module is further to determine whether a subsequent access to the memory is a page hit or a page miss, when the subsequent access to the memory is page hit, increment the counter, and when the subsequent access to the memory is page hit, decrement the counter.

Example 51 is a non-transitory machine-readable storage medium including data that, when accessed by a processor, cause the processor to perform operations comprising: tracking a plurality of memory accesses to a plurality of pages in a memory with a counter, analyzing the counter to determine a hit rate for the plurality of pages in the memory, determining whether the hit rate is greater than a threshold, when the hit rate is greater than the threshold, applying an open-page policy for accessing the plurality of pages in the memory, and when the hit rate is less than or equal to the threshold, applying a close page policy for accessing the plurality of pages in the memory.

Example 52 may optionally extend the subject matter of example 51. In example 52 the operations further comprise maintaining a second counter to track a second plurality of memory accesses to a second plurality of pages in the memory, wherein the plurality of pages are part of a first bank in the memory and wherein the second plurality of pages are part of a second bank in the memory, analyzing the second counter to determine a second hit rate for the second plurality of pages in the memory, determining whether the second hit rate is greater than the threshold, when the second hit rate is greater than the threshold, applying the open-page policy for accessing the memory, and when the second hit rate is less than or equal to the threshold, applying the close page policy for accessing the memory.

Example 53 may optionally extend the subject matter of examples 51-52. In example 53 the operations further comprise tracking additional memory accesses to pages in a memory with the counter, analyzing the counter to determine a second hit rate, determining whether the second hit rate is greater than the threshold, when the second hit rate is greater than the threshold, applying an open-page policy for accessing the memory, and when the second hit rate is less than or equal to the threshold, applying a close page policy for accessing the memory.

Example 54 may optionally extend the subject matter of examples 51-53. In example 54 the operations further comprise determining that a pending memory access will access an open page in the memory and refraining from closing the open page when applying the close page policy for accessing the memory.

Example 55 may optionally extend the subject matter of examples 51-54. In example 55 the operations further comprise determining that a pending memory access will not access an open page in the memory and closing the open page when applying the open page policy for accessing the memory.

Example 56 may optionally extend the subject matter of examples 51-55. In example 56 the operations further comprise determining that an open page in the memory has not been accessed for a period of time and closing the open page when applying the open-page policy for accessing the memory.

Example 57 may optionally extend the subject matter of examples 51-56. In example 57 the operations further comprise determining whether a subsequent access to the memory is a page hit or a page miss, when the subsequent access to the memory is page hit, incrementing the counter, and when the subsequent access to the memory is page hit, decrementing the counter.

Example 58 is an apparatus comprising: means for tracking a plurality of memory accesses to a plurality of pages in a memory with a counter, means for analyzing the counter to determine a hit rate for the plurality of pages in the memory, means for determining whether the hit rate is greater than a threshold, means for applying an open-page policy for accessing the plurality of pages in the memory when the hit rate is greater than the threshold, and means for applying a close page policy for accessing the plurality of pages in the memory when the hit rate is less than or equal to the threshold.

Example 59 may optionally extend the subject matter of example 58. In example 59 the apparatus further comprises means for maintaining a second counter to track a second plurality of memory accesses to a second plurality of pages in the memory, wherein the plurality of pages are part of a first bank in the memory and wherein the second plurality of pages are part of a second bank in the memory, means for analyzing the second counter to determine a second hit rate for the second plurality of pages in the memory, means for determining whether the second hit rate is greater than the threshold, means for applying the open-page policy for accessing the memory when the second hit rate is greater than the threshold, and means for applying the close page policy for accessing the memory when the second hit rate is less than or equal to the threshold.

Example 60 may optionally extend the subject matter of example 58-59. In example 60 the apparatus further comprises means for tracking additional memory accesses to pages in a memory with the counter, means for analyzing the counter to determine a second hit rate, means for determining whether the second hit rate is greater than the threshold, means for applying an open-page policy for accessing the memory when the second hit rate is greater than the threshold, and means for applying a close page policy for accessing the memory when the second hit rate is less than or equal to the threshold.

Example 61 may optionally extend the subject matter of example 58-60. In example 61 the apparatus further comprises means for determining that a pending memory access will access an open page in the memory and means for refraining from closing the open page when applying the close page policy for accessing the memory.

Example 62 may optionally extend the subject matter of example 58-61. In example 62 the apparatus further comprises means for determining that a pending memory access will not access an open page in the memory and means for closing the open page when applying the open page policy for accessing the memory.

Example 63 may optionally extend the subject matter of example 58-62. In example 63 the apparatus further comprises means for determining that an open page in the memory has not been accessed for a period of time and means for closing the open page when applying the open-page policy for accessing the memory.

Example 64 may optionally extend the subject matter of example 58-63. In example 64 the apparatus further comprises means for determining whether a subsequent access to the memory is a page hit or a page miss, means for incrementing the counter when the subsequent access to the memory is page hit, and means for decrementing the counter when the subsequent access to the memory is page hit. In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "maintaining," "identifying," "applying," "updating," "refraining," "closing," "resetting," "updating," "incrementing," "decrementing," "analyzing," "tracking," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:

storing a memory access history for a memory;

storing a copy of the memory access history before an update to the memory access history;

updating the memory access history responsive to a new memory access to a page in the memory;

hashing the copy of the memory access history with a memory address corresponding to the page in the memory, to generate a hashed memory access history for the page, wherein the hashed memory access history comprises an identifier;

selecting a first counter from a plurality of counters in a counter table according to the identifier, wherein the first counter tracks page reads and page writes for the page;

determining whether the first counter is greater than a threshold;

when the first counter is greater than the threshold, applying an open-page policy for accessing the memory; and when the first counter is less than or equal to the threshold, applying a close page policy for accessing the memory.

2. The method of claim 1, wherein the threshold comprises a first threshold and wherein the memory access history comprises a first memory access history, the method further comprising:

storing a second memory access history for the memory;

identifying a second counter of a second plurality of counters based on a copy of the second memory access history;

determining whether the second counter is greater than a second threshold;

when the second counter is greater than the second threshold, applying the open-page policy for accessing the memory; and when the second counter is less than or equal to the second threshold, applying the close page policy for accessing the memory.

3. The method of claim 1, further comprising:

storing a second memory access history for the memory;

identifying a second counter of the plurality of counters based on the hashed memory access history;

determining whether the second counter is greater than the threshold;

when the second counter is greater than the threshold, applying the open-page policy for accessing the memory; and when the second counter is less than or equal to the threshold, applying the close page policy for accessing the memory.

4. The method of claim 1, further comprising:

updating the memory access history based on additional memory accesses, to generate an updated memory access history;

hashing the updated memory access history with a second memory address corresponding to the page in the memory, to generate a second hashed memory access history for the page;

identifying a second counter of a second plurality of counters based on the second hashed memory access history;

when the second counter is greater than the threshold, applying the open-page policy for accessing the memory; and when the second counter is less than or equal to the threshold, applying the close page policy for accessing the memory.

5. The method of claim 1, further comprising:

determining that a pending memory access will access an open page in the memory; and refraining from closing the open page when applying the close page policy for accessing the memory.

6. The method of claim 1, further comprising:

determining that a pending memory access will not access an open page in the memory; and closing the open page when applying the open page policy for accessing the memory.

7. The method of claim 1, wherein the page is accessed during execution of a first application or block of instructions, the method further comprising:

resetting the first counter in response to changing execution to a second application or block of instructions.

8. The method of claim 1, further comprising:

determining that the page is an open page in the memory that has not been accessed for a period of time; and closing the page when applying the open-page policy for accessing the memory in response to determining that the page has not been accessed for the period of time.

9. The method of claim 1, further comprising:

determining whether a subsequent access to the memory is a page hit or a page miss;

when the subsequent access to the memory is a page hit, updating the memory access history and incrementing the first counter; and when the subsequent access to the memory is a page miss, updating the memory access history and decrementing the first counter.

10. An apparatus comprising:

a memory to store data;

a processor communicatively coupled to the memory and the processor comprising a memory module to:

store a memory access history for the memory;

store a copy of the memory access history before an update to the memory access history;

update the memory access history responsive to a new memory access to a page in the memory;

combine the copy of the memory access history with a memory address corresponding to the page in the memory, to generate a memory access value for the page, wherein the memory access value comprises an identifier;

select a first counter from a plurality of counters in a counter table according to the identifier, wherein the first counter tracks page reads and page writes for the page;

determine whether the first counter is greater than a threshold;

when the first counter is greater than the threshold, apply an open-page policy to access the memory; and when the first counter is less than or equal to the threshold, apply a close page policy to access the memory.

11. The apparatus of claim 10, wherein the threshold comprises a first threshold and the memory access history comprises a first memory access history, wherein the memory module is further to:

store a second memory access history for the memory;

identify a second counter of a second plurality of counters based on a copy of the second memory access history;

determine whether the second counter is greater than a second threshold;

when the second counter is greater than the second threshold, apply the open-page policy to access the memory; and when the second counter is less than or equal to the second threshold, apply the close page policy to access the memory.

12. The apparatus of claim 10, wherein the memory module is further to:

store a second memory access history for the memory;

identify a second counter of the plurality of counters based on the memory access value;

determine whether the second counter is greater than the threshold;

when the second counter is greater than the threshold, apply the open-page policy to access the memory; and when the second counter is less than or equal to the threshold, apply the close page policy to access the memory.

13. The apparatus of claim 10, wherein the memory module is further to:

update the memory access history based on additional memory accesses, to generate an updated memory access history;

combine the updated memory access history with a second memory address corresponding to the page in the memory, to generate a second memory access value for the page;

identify a second counter of a second plurality of counters based on the second memory access value;

when the second counter is greater than the threshold, apply the open-page policy to access the memory; and when the second counter is less than or equal to the threshold, apply the close page policy to access the memory.

14. The apparatus of claim 10, wherein the memory module is further to:

determine that a pending memory access will access an open page in the memory; and refrain from closing the open page when applying the close page policy to access the memory.

15. The apparatus of claim 10, wherein the memory module is further to:

determine that a pending memory access will not access an open page in the memory; and close the open page when applying the open page policy to access the memory.

16. The apparatus of claim 10, wherein the page is accessed during execution of a first application or block of instructions, wherein the memory module is further to:

reset the first counter in response to changing execution to a second application or block of instructions.

17. The apparatus of claim 10, wherein the memory module is further to:

determine that the page is an open page in the memory that has not been accessed for a period of time; and close the open page when applying the open-page policy to access the memory in response to determining that the page has not been accessed for the period of time.

18. The apparatus of claim 10, wherein the memory module is further to:

determine whether a subsequent access to the memory is a page hit or a page miss;

when the subsequent access to the memory is a page hit, update the memory access history and incrementing the first counter; and when the subsequent access to the memory is a page miss, update the memory access history and decrementing the first counter.

19. A non-transitory machine-readable storage medium comprising data and instructions that, when accessed by a processor, cause the processor to:

store a plurality of memory accesses to a plurality of pages in a memory access history for a memory;

store a copy of the memory access history before an update to the memory access history;

update the memory access history responsive to a new memory access to a page in the memory;

hash the memory access history with a memory address corresponding to the page in the memory, to generate a hashed memory access history for the page, wherein the hashed memory access history comprises an identifier;

select a first counter from a plurality of counters in a counter table according to the identifier, wherein the first counter tracks page reads and page writes for the page;

when the first counter is greater than a threshold, apply an open-page policy for accessing the plurality of pages in the memory; and when the first counter is less than or equal to the threshold, apply a close page policy for accessing the plurality of pages in the memory.

20. The non-transitory machine-readable storage medium of claim 19, wherein the threshold comprises a first threshold and wherein the memory access history comprises a first memory access history, and wherein the instructions further cause the processor to:

store a second memory access history;

identify a second counter of a second plurality of counters based on a copy of the second memory access history;

determine whether the second counter is greater than a second threshold;

when the second counter is greater than the second threshold, apply the open-page policy for accessing the memory; and when the second counter is less than or equal to the second threshold, apply the close page policy for accessing the memory.

21. The non-transitory machine-readable storage medium of claim 19, wherein the instructions further cause the processor to:

store a second memory access history for the memory;

identify a second counter of the plurality of counters based on the hashed memory access history;

determine whether the second counter is greater than the threshold;

when the second counter is greater than the threshold, apply the open-page policy for accessing the memory; and when the second counter is less than or equal to the threshold, apply the close page policy for accessing the memory.

22. The non-transitory machine-readable storage medium of claim 19, wherein the instructions further cause the processor to:

determine that a pending memory access will access an open page in the memory; and refrain from closing the open page when applying the close page policy for accessing the memory.

23. The non-transitory machine-readable storage medium of claim 19, wherein the instructions further cause the processor to:

determine that a pending memory access will not access an open page in the memory; and close the open page when applying the open page policy for accessing the memory.

24. The non-transitory machine-readable storage medium of claim 19, wherein the instructions further cause the processor to:

determine that the page is an open page in the memory that has not been accessed for a period of time; and close the page when applying the open-page policy for accessing the memory.

25. The non-transitory machine-readable storage medium of claim 19, wherein the instructions further cause the processor to:

determine whether a subsequent access to the memory is a page hit or a page miss;

when the subsequent access to the memory is a page hit, incrementing the first counter; and when the subsequent access to the memory is a page miss, decrementing the first counter.

* * * * *